United States Patent
Tsukamoto

[19]

[11] Patent Number: 5,867,677
[45] Date of Patent: Feb. 2, 1999

[54] SWITCHING ADAPTER AND METHOD FOR A COMPUTER SYSTEM

[75] Inventor: Yuji Tsukamoto, Tokyo, Japan

[73] Assignee: Mitsubishi Denki Kabushiki Kaisha, Tokyo, Japan

[21] Appl. No.: 563,614

[22] Filed: Nov. 28, 1995

[30] Foreign Application Priority Data

Dec. 28, 1994 [JP] Japan .................................. 6-328307

[51] Int. Cl.$^6$ ...................................................... G06F 13/00
[52] U.S. Cl. ...................... 395/311; 395/309; 395/885; 395/886; 370/358; 370/395; 370/398
[58] Field of Search .................................. 395/311, 884, 395/841; 370/358, 321, 345, 215, 248, 395, 398, 60; 340/825, 310; 364/200

[56] References Cited

U.S. PATENT DOCUMENTS

| | | | |
|---|---|---|---|
| 4,975,906 | 12/1990 | Takiyasu et al. | 370/85.13 |
| 5,184,346 | 2/1993 | Kozaki et al. | 370/60 |
| 5,251,204 | 10/1993 | Izawa et al. | 370/15 |
| 5,280,476 | 1/1994 | Kojima et al. | 370/60.1 |
| 5,357,510 | 10/1994 | Norizuki et al. | 370/60.1 |
| 5,519,689 | 5/1996 | Kim | 370/17 |
| 5,530,698 | 6/1996 | Kozaki et al. | 370/60.1 |
| 5,555,265 | 9/1996 | Kakuma et al. | 370/60 |
| 5,570,348 | 10/1996 | Holden | 370/17 |

FOREIGN PATENT DOCUMENTS

| | | |
|---|---|---|
| 4-180322 | 11/1990 | Japan . |
| 3-19452 | 1/1991 | Japan . |
| 3-106247 | 5/1991 | Japan . |
| 5-48639 | 2/1993 | Japan . |
| 6-169319 | 6/1994 | Japan . |

OTHER PUBLICATIONS

"B–ISDN Illustration Reader", pp. 66–71 and 84–87, Ohm-u–sha, Jan. 30, 1993.

*Primary Examiner*—Thomas C. Lee
*Assistant Examiner*—Eric S. Thlang
*Attorney, Agent, or Firm*—Wolf, Greenfield & Sacks, P.C.

[57] ABSTRACT

A function of a switch apparatus is realized as an adapter. Signaling data which cannot be processed in the adapter, is output to a mainframe bus of a computer through an AAL controller, a RAM, and a bus controller. The computer processes the signaling data and sends it to a switch adapter through the mainframe bus. The signaling data is input to an 8×8 switch through the bus controller, the RAM, the AAL controller. Usual user information is switched by a PHY unit, a TC/ATM controller, an address converter, and the 8×8 switch. By connecting the switch adapter to the computer, it is possible for the computer to operate as a switch apparatus without damaging its function.

31 Claims, 28 Drawing Sheets

Fig.7

53:CAM ARRAY

| INPUT VCI | OUTPUT VCI | OUTGOING LINE |
|---|---|---|
| 01 | 01 | $2_1$ |
| 08 | 12 | $2_2$ |
| 11 | 10 | $2_4$ |
| 13 | 24 | $2_7$ |
| ⋮ | ⋮ | ⋮ |

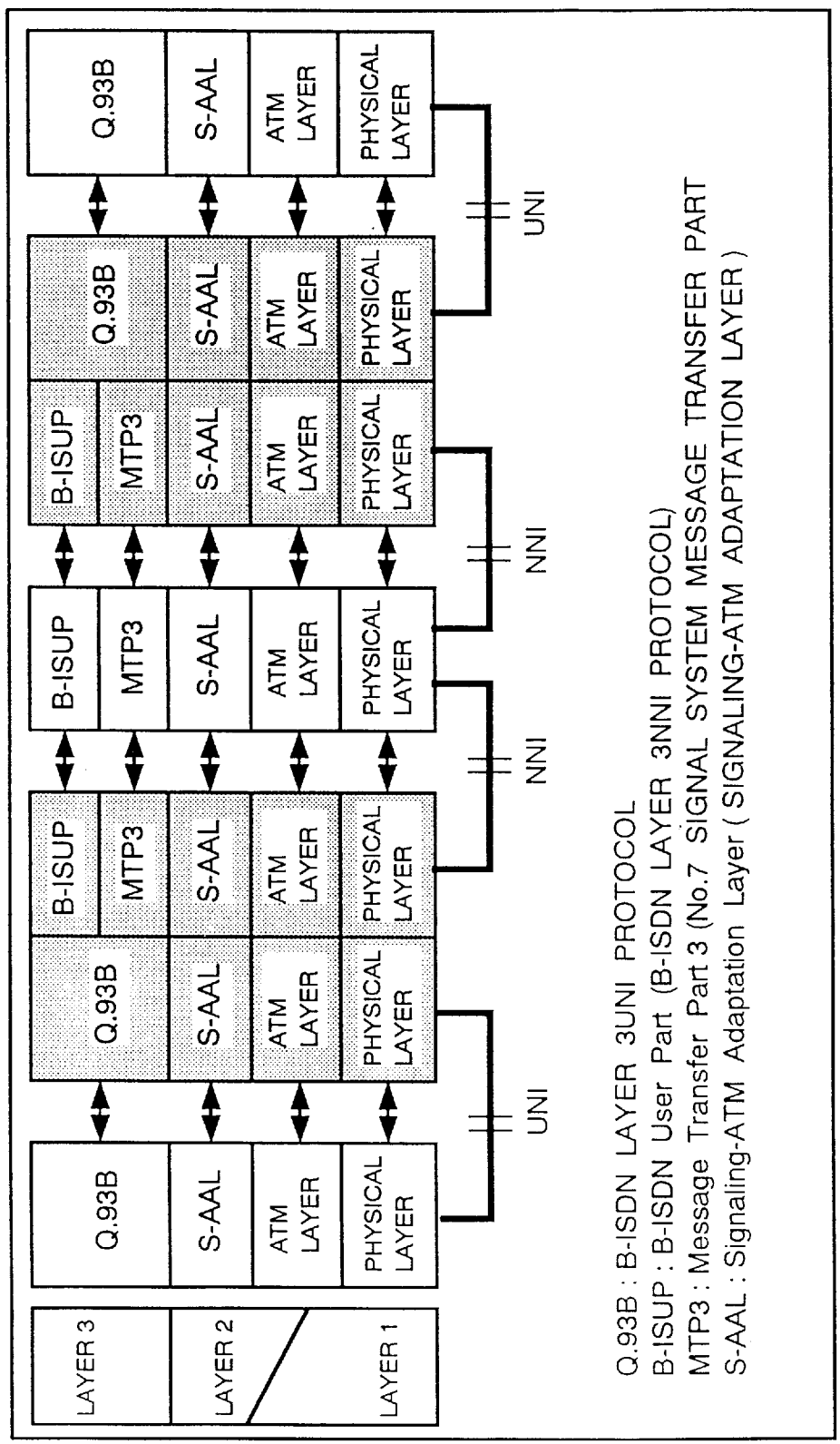

SWITCHING ADAPTER AND METHOD FOR A COMPUTER SYSTEM

BACKGROUND OF THE INVENTION

1. Field of the Invention

This invention relates to a switch adapter in which the switch function is implemented as a single adapter. More specifically, this invention relates to a computer which can operate as a switch without damaging the function of the computer just by connecting the switch adapter to the computer.

2. Description of the Prior Art

FIG. 25 illustrates a conventional Asynchronous Transfer Mode (ATM) switch.

The conventional ATM switch is made of a single hardware frame. The inside of the ATM switch has a switch unit and a plurality of line interface units. A dedicated proprietary bus is mounted to connect the switch unit to the line interface units. A dedicated proprietary interface architecture can be utilized instead of the dedicated proprietary bus to connect the switch unit to the line interface units.

Since the ATM switch is realized as proprietary hardware, it is necessary to develop the switch according to proprietary specifications, depending on the ATM switch in a case where additional functions are implemented for the ATM switch.

FIG. 26 shows a network configuration in a case where the conventional ATM switch, as shown in FIG. 25, is utilized.

A plurality of computers and terminals are wired centrally to the ATM switch. Since a plurality of computers and terminals are wired centrally for a single ATM switch, a function for switching the ATM switch should be performed at a high speed. In addition, the number of accommodated communication lines in the line interface units of the ATM switch should be increased.

FIG. 27 shows a cell format. The cell comprises a header and a pay load. The header contains a Virtual Pass Identifier (VPI) and a Virtual Channel Identifier (VCI).

FIG. 28 shows a conventional ATM switch as shown in "B-ISDN illustration reader", page 67, Ohmu-sha, Jan. 30, 1993.

There are various controls required in the ATM switch. The basic controls are described with reference to FIG. 28 and the description of pages 66 to 71 in "B-ISDN illustration reader".

(1) routing control

The communication is started when a communication requirement called a "calling" process occurs from the terminal. In a line switching system, the "calling" process is performed according to the subscriber's line signal, such as a dial number (D channel signal in N-ISDN). In the ATM switch system, the "calling" signal is transferred to the ATM switch by the cell, found in FIG. 27. The cell that transfers the control information, such as a signal, is called as a control cell and given a predetermined VCI. This control cell can be distinguished from a cell that transmits the user information. The ATM switch receives information such as the destination to which the ATM switch is connected, types of services and a transmission speed of cells and then determines which ATM switch in the network is passed through. This procedure is called routing control.

(2) Connection Admission Control

According to the routing control, the ATM switches are connected in series. The ATM switch transfers the control cells one after another to the connected ATM switch, determined by the routing control. The ATM switch then confirms that all of the ATM switches can pass the control cells under the required service condition. For example, it judges if required traffic exceeds the transmission capacity.

When the ATM switch determines that the transmission capacity is large enough for the required traffic, it indicates that communication can be implemented for the terminal and enters a communication mode. The described communication allowing procedure is called Connection Admission Control (CAC).

(3) Usage Parameter Control

Connection Admission Control of the ATM switch differs from line switching and packet switching. The ATM switch differs because certain parameters peculiar to the ATM switch, such as transmission capacity and quality, required for transmission, are reported. Since a flow of burst traffic is allowed in the ATM switch system, transmission capacity is defined by the peak speed when the interval between cells approaches its minimum and the average speed in a long period. In the ATM switch system, management of system capacity is carried out so as to effectively handle burst traffic through use of the system equipment. When a call exceeds the quantity of contract and large quantities of cells are flown, there is a danger of lowering the quality of the whole network. Accordingly, a communication network which admits call monitors at its entrance must determine whether the transmission capacity reported by the control cell, from the transmitting terminal, matches the actual incoming quantity of cells, from the transmitting terminal.

In this method, at each contract with the subscriber, the process of discarding irregular cells, for instance, is performed when the actual traffic exceeds the predefined value. This procedure is called Usage Parameter Control (UPC).

A cell which passes through the function of UPC is transferred via the ATM switch to a route for the next node. The VCI in correspondence with the route as information required for switching is given on the header of the cell and transmitted to the next node.

(4) Shaping

Since cells are switched to each route according to the ATM switch, cells may be centralized to the specific route. As a result, there happens a case where cells should be transmitted at a fast instantaneous speed which exceeds the capacity of a Virtual Path (VP). In this case, each cell is temporarily stored in a buffer memory and read out in order that the instantaneous speed of cells might not exceed a fixed value (capacity of the VP). This procedure is called shaping.

(5) Priority control of cells

It is possible to control which cell should be transmitted with priority and then to provide a higher quality than a normal quality (the quality is shown at a cell loss rate) for the cell to be transmitted with priority. A Cell Loss Priority (CLP) bit is defined in the header of the cell, allowing user to indicate which cell should be transmitted with priority.

(6) Congestion Control

In the public network, it is important to provide the control technique such as a congestion control technique that will prevent the network from panicking when traffic is congested. There are various methods for providing a congestion control technique. For example, one method will reject the new requirement of connection according to the CAC at the time of congestion. Another method changes the parameter value of the usage parameter control, for example, restricting the peak speed at which the user can transmit.

FIGS. 29 to 31 and the following description explains the protocol based on the conventional ATM system, as shown on pages 84 to 87 of the "B-ISDN illustration reader".

A physical layer is related to the physical medium. An ATM layer deals with a transfer of the cells common to all the service. An ATM Adaptation Layer (AAL) deals with a function that depends on each service and prescribes a plurality of protocols in correspondence with each service. The addition and change of the function of the upper layer, which will depend on each service is absorbed by the ATM adaptation layer in order to prevent affecting the transferring function for cells. Protocols above the ATM adaptation layer, which will depend on the service, are all handled on the side of the terminal (This is applicable to the user information, apart from the control information to deal with the setting and release of the call).

In the ATM adaptation layer, as shown in FIG. 31, information fields (or pay loads) of several cells are connected in series. These information fields are then covered with header information on the top and trailer information on the tail. They are treated as a data unit. The ATM adaptation layer is separated into a Segmentation and Reassembly Sublayer (SARS) and a Convergence Sublayer (CS). The SARS segments the data unit into a plurality of cells and reassembles a plurality of cells into the data unit. The CS checks and testifies the correctness of data and corrects data errors depending on a requirement of each type of services. The CS then provides the result to the upper layer.

Control information deals with setting, maintenance and release of the call and connection between the network and the terminal. As in FIG. 32, the upper layer of the AAL utilizes a call control protocol based on N-ISDN.

In the figure, Q. 93B shows a B-ISDN layer 3 User Network Information (UNI) protocol, B-ISUP shows a B-ISDN User Part (B-ISDN layer 3 Network Node Interface (NNI) protocol), MTP3 is a Message Transfer Part 3 (No. 7 signal system message transfer part), S-AAL shows a Signaling-ATM adaptation Layer.

The above descriptions are quotations from the articles in "B-ISDN illustration reader", pages 66 to 71 and 84 to 87, Ohmu-sha, Jan. 30, 1993.

Since a conventional ATM switch is realized in the proprietary frame based on the specific specification, it is difficult to extend the function of the ATM switch.

For example, when the interface for a local area network (LAN) is added, it is necessary to carry out the specific development dependant on the ATM switch.

When an interface with a wide area network, like an ISDN, is adopted, it is necessary to carry out the specific development dependant on the ATM switch.

Furthermore, when a bridge function, a route function and a communication line monitoring function are added, it is necessary to carry out the specific development depending to the ATM switch.

A network configuration which utilizes a conventional ATM switch has to implement the centralized connection in which a switch is centered. As a result, problems such as the increase of the number of accommodated communication lines and the high-speeding of the processing speed of the ATM switch arise.

SUMMARY OF THE INVENTION

This invention solves these problems. It is an object to provide the ATM switch adapter with the ATM switch function, which has extensibility and flexibility.

Furthermore, in a case where the function of the ATM switch is implemented by the ATM switch adapter, it is an object of the invention to include the ATM switch adapter in a standard computer without damaging the function of the computer.

Furthermore, an object of the invention is to obtain an ATM switch adapter and a computer which will easily implement the bridge function, the route function and the communication line monitoring function.

According to one aspect of this invention
a switch adapter may include:
a switch unit having a plurality of input ports that receive input data that has a destination and a plurality of output ports that output input data with respect to its destination;
a controller, coupled to the switch unit, that controls a data process, the controller being connected to a specific input port among the plurality of input ports of the switch unit and connected to a specific output port among the plurality of output ports of the switch unit; and
an interface unit, coupled to the controller, that provides an interface between the controller and an exterior device.

According to another aspect of this invention,
a switch adapter mounted in a computer may include:
a switch unit, having at least two input ports that receive input data that has a destination, that switches the input data according to its destination, and that outputs the input data to at least two output ports;
an address convertor, coupled to a second to a last of the at least two input ports, that sorts input data, received from the second to the last of the at least two input ports, into control data and switching data, that sets a destination of the control data to a first output port of the at least two output ports and sets a destination of the switching data to a second to a last of the at least two output ports of the switch unit;
a controller, connected to the first input port of the at least two input ports and to a first output port of the at least two output ports, that processes the control data and transfers the control data from and to the switch unit; and
an interface unit that transmits the control data, processed by the controller, to a computer and transmits computer control data, generated by the computer, to the controller.

According to another aspect of this invention,
a computer may include:
a switch adapter which includes:
a switch unit, having a plurality of input ports that receives input data that has a destination, that switches the input data according to its destination, and that outputs the input data to a plurality of output ports;
a controller that controls data processing, the controller being connected to a specific input port of the plurality of input ports of the switch unit and connected to a specific output port of the plurality of output ports of the switch unit; and
an interface unit that provides an interface between the controller and an exterior device;
a bus that connects the interface unit of the switch adapter to the exterior device; and
a data processor that processes data and transfers it to the controller through the interface unit and the bus.

According to another aspect of this invention, a data switching method of a general purpose computer which connects a switch adapter, having a switch unit, to a bus, may include the steps of:
- A. receiving input data having a destination;
- B. recognizing whether input data is control data or switching data according to the destination of the input data, and setting the destination of the input data to correspond to a specific output port of the switch unit when the input data is control data;
- C. inputting the control data and the switching data to the switch unit, switching the switching data to the destination of the input data when the input data is switching data, and outputting the control data to the destination of the input data that corresponds to the specific output port of the switch unit when the input data is control data;
- D. transferring the control data output to the specific output port of the switch unit through the bus to the general purpose computer; and
- E. processing the control data in the general purpose computer.

According to another aspect of this invention, a switch adapter may include:
- a switch unit having a plurality of input ports that receive input data that has a destination, and a plurality of output ports that output the input data according to its destination;
- controlling means, coupled to the switch unit, that receives the input data, that is determined to be control data, from a controller output port of the plurality of output ports, performs data processing on the received control data and outputs the control data to a controller input port of the plurality of input ports; and
- interface means, coupled to the controlling means, that allows for data transmission between the switch adapter and an exterior device.

According to another aspect of this invention, a switch adapter mounted in a computer may include:
- a switch unit having a plurality of input ports that receive input data and a plurality of output ports that output the input data, and wherein the switch unit switches the destination of the input data received by the plurality of input ports;
- an address convertor, coupled to a second to a last of the plurality of input ports, which sorts the input data received by the plurality of input ports into switching data and signaling data;
- a controller, coupled to a first input port of the plurality of input ports and coupled to a first output port of the plurality of output ports, that transfers the signaling data to and from the switch unit; and
- an interface unit, coupled to the controller, that transmits the signaling data to the computer from the controller and that transmits the signaling data to the controller from the computer.

According to another aspect of this invention, a computer may include:
- a switch adapter including:
  - a switch unit, having a plurality of input ports that receive input data and a plurality of output ports that output the input data;
  - a controller that controls data processing of the input data that corresponds to control data, the controller being coupled to a controller input port of the plurality of input ports and the controller being coupled to a controller output port of the plurality of output ports; and
  - an interface unit that couples the controller to an exterior device;
- a bus that couples the interface unit to the switch adapter; and
- a data processor, coupled to the interface unit, which transfers data through the interface unit and the bus.

According to another aspect of this invention, a method for switching data in a general purpose computer, may include the steps of:
- A. inputting input data having a destination;
- B. determining the input data to be one of either control data or switching data, according to the destination of the input data;
- C. setting the destination of the input data to a controller output port of a switch unit of the computer if the input data is determined to be the control data;
- D. inputting the switching data to the switch unit;
- E. switching the switching data according to the destination of the switching data;
- F. outputting the control data to a controller output port of the switch unit;
- G. transferring the control data, output to the controller output port, to the general purpose computer through a bus; and
- H. processing the control data, transferred through the bus, in the general purpose computer.

According to another aspect of this invention, a computer system may include:
- a plurality of interconnected computers;
- a plurality of interface units, each interface unit connecting one computer of the plurality of interconnected computers to another computer of the plurality of interconnected computers;
- each computer of the plurality of computers including:
  - a plurality of adapters including a switch adapter, a remote maintenance Local Area Network (LAN) adapter, coupled to the switch adapter, a wide area network connecting adapter, coupled to the switch adapter, and a LAN adapter, coupled to the switch adapter; and
  - a mainframe bus connected to each of the plurality of adapters;
  - wherein each computer can transmit data to any other computer via at least one interface unit.

BRIEF DESCRIPTION OF THE DRAWINGS

In the drawings,

FIG. 7 shows a view of a CAM array according to this invention;

FIG. 32 shows a protocol of a conventional control information.

DESCRIPTION OF PREFERRED EMBODIMENTS

Embodiment 1

Figure 1:
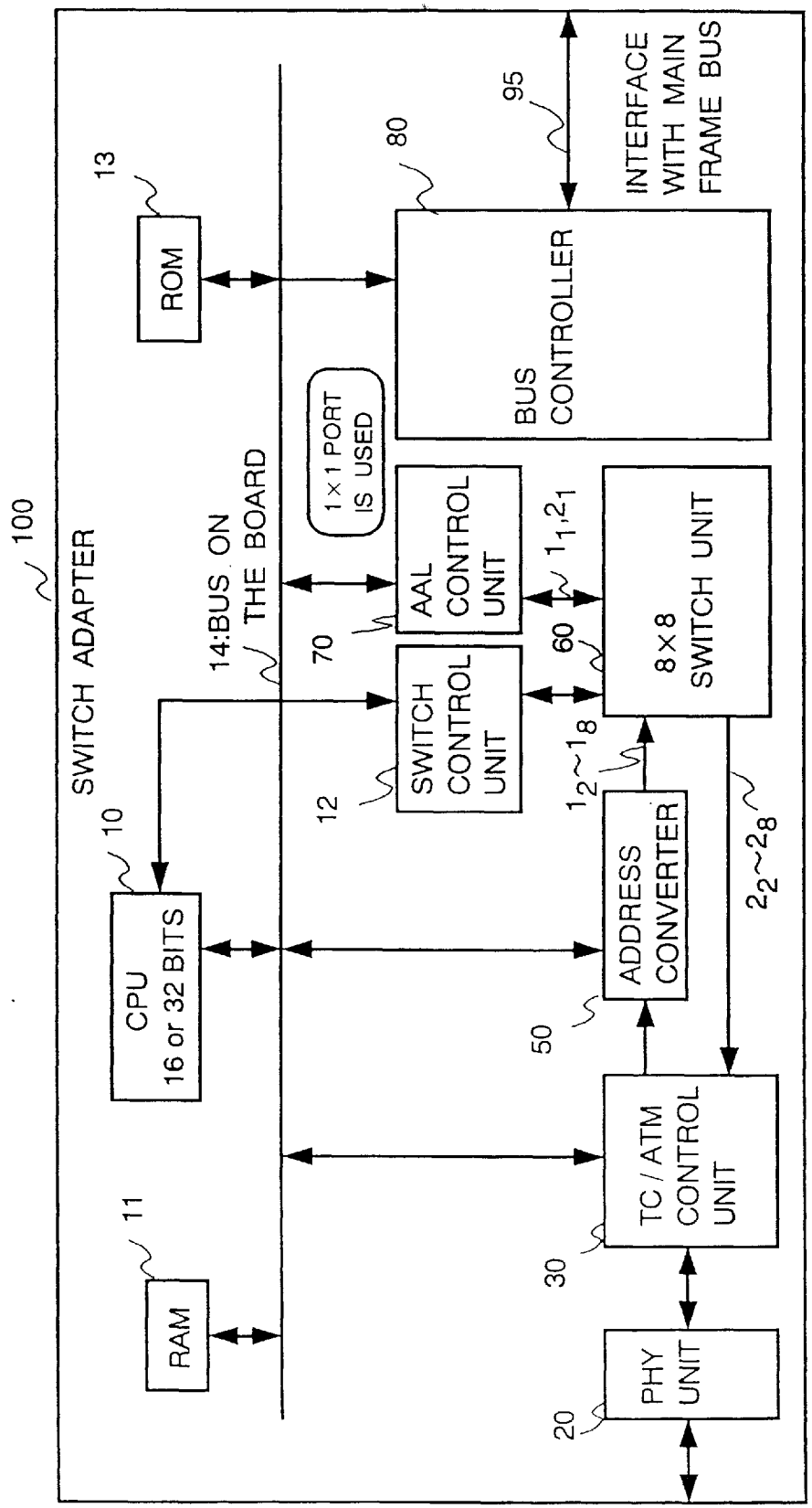
FIG. 1 shows a switch adapter according to this invention.

FIG. 1 shows a configuration of an ATM switch adapter. The following are descriptions of each element of the switch adapter 100.

The physical layer protocol (PHY) unit 20 processes the physical layer protocol. The PHY unit is connected to the connection interface of the communication lines. A Transmission Convergence/Asynchronous Transfer Mode (TC/ATM) control unit 30 divides the frame received by the PHY unit 20 into cells. The TC/ATM control unit 30 also receives the cells from an 8×8 switch 60 (described later) and transmits them to the PHY unit 20 as a frame. The cell divided by the TC/ATM control unit 30 is input to an address convertor 50. The address convertor 50 rewrites the address on the header of the cell. The 8×8 switch 60 inputs cells to the TC/ATM control unit, which outputs the cells to an indicated destination according to their header addresses. The 8×8 switch 60 includes eight input lines $1_1$–$1_8$ and eight output lines $2_2$–$2_8$. Among the eight input lines and eight output lines, seven input lines $1_2$–$1_8$ and seven output lines $2_2$–$2_8$ are utilized for switching data of the communication lines connected to the PHY unit 20. Input line $1_1$ and output line $2_1$ are connected to an ATM adaptation layer (AAL) control unit 70. The AAL control unit 70 processes the service which is conscious of mediums such as the speech, data, and movies. When the information from the service is transferred into the cell units, the AAL control unit is unable to carry out the service, while still conscious of the difference of the mediums such as speech, data, and movies. Therefore, when the AAL control unit 70 segments information into cells or reassembles information from cells, it recognizes and absorbs the differences in the quality requirement of the information. A delay time and an error rate are recognized and absorbed by the AAL control unit, as the differences in quality requirements.

The switch adapter 100 has a 16 bit or 32 bit Central Processing Unit (CPU) 10. A bus 14 on the board is provided for the CPU 10. A Random Access Memory (RAM) 11 and a Read Only Memory (ROM) 13 are connected to the bus 14 on the board, storing the program and data required for the operation of the CPU 10. A switch control unit 12 initializes the 8×8 switch 60, setting a fixed register value (not shown in the figure) in the 8 ×8 switch 60 and controlling the operation of the 8×8 switch 60.

A bus controller 80 is connected to the bus 14 on the board. The bus controller 80 is an interface when the switch adapter 100 is connected to the mainframe bus of the computer mainframe.

The switch adapter 100, according to this embodiment, is characterized by exclusive allocation of the first input line $1_1$ and the second input line $2_1$ for the AAL control unit 70. Information output by the AAL control unit 70 is temporarily stored in the RAM 11 via the bus 14 on the board. The information stored in the RAM 11 is output to the mainframe bus of the computer by the bus controller 80. Information from the mainframe bus of the computer is stored in the RAM 11 by the bus controller 80. Information stored in the RAM 11 is transmitted to the AAL control unit 70 via the bus 14 on the board. The cells input to the input line $1_1$ from the AAL control unit 70 are output, like the usual cells, to their indicated destination, according to their header address.

Figure 2:
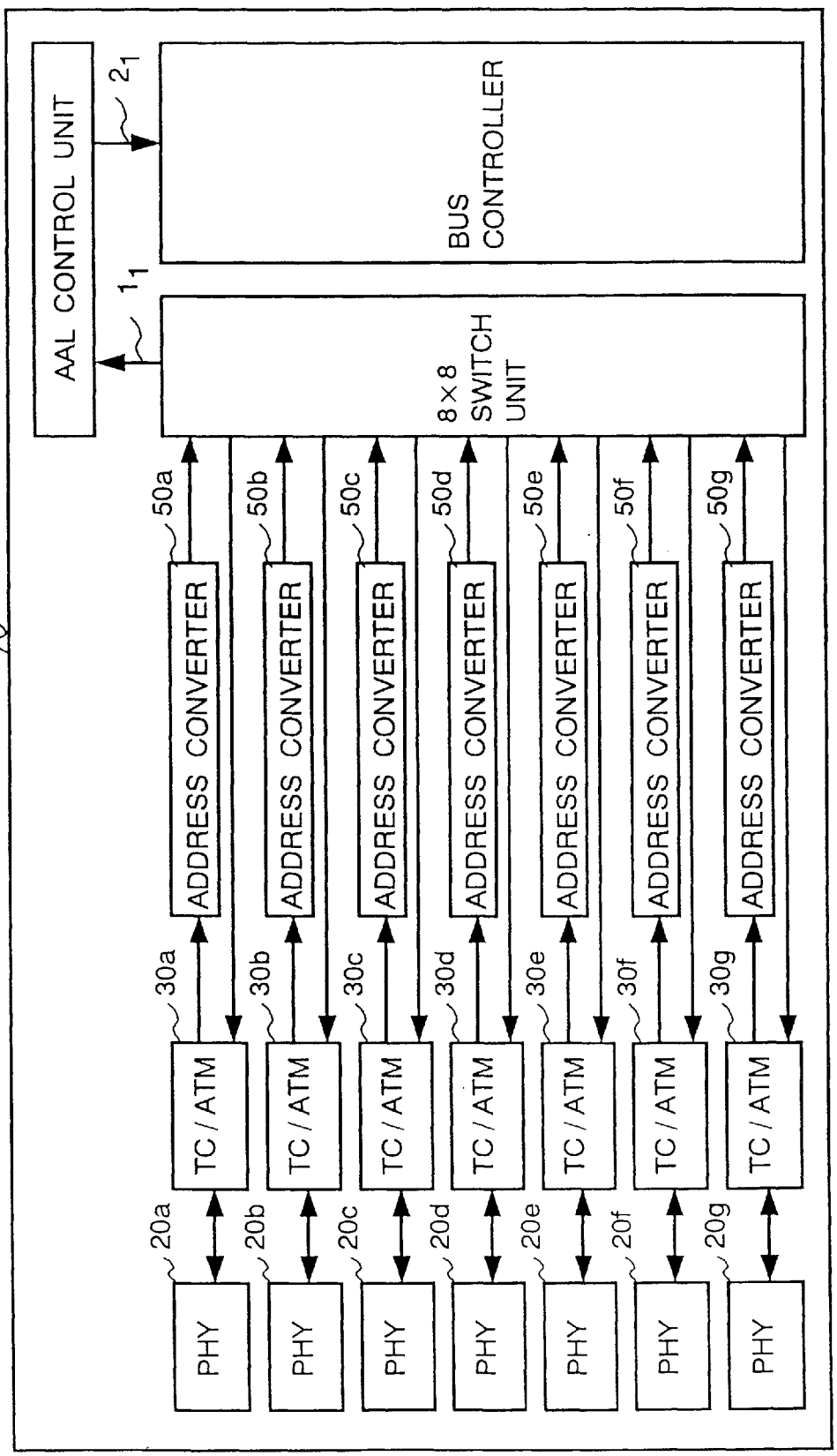
FIG. 2 shows a detailed view of one of the switch adapters according to this invention.

FIG. 2 shows a view of a unit of the switch adapter 100 in further detail.

The PHY unit 20 is comprised of seven PHY units 20a to 20g. The TC/ATM control unit 30 is comprised of seven TC/ATM control units 30a to 30g. The address convertor 50 is comprised of seven address convertors 50a to 50g.

The switch adapter 100 switches of the user information using the PHY unit 20, the TC/ATM control unit 30, the address convertor 50 and the 8×8 switch 60. The physical layer and ATM layer specifically switch the user information. The control information is transmitted by the AAL control unit 70, through the bus controller 80, to the computer mainframe. The computer mainframe then processes the setting and releasing of calls requested by the control unit.

Control information such as the setting, maintenance, and release of the call or connection, is referred to as signaling data. User information is referred to as switching data. Both the signaling data and the switching data are segmented into cells for transmission and reception. The VCI on the header of a cell containing signaling data is given a predefined value in advance. When a cell containing the signaling data is input to the address convertor 50, the destination of the cell is changed to the output line 2₁. The 8×8 switch 60 outputs a cell containing signaling data to the AAL control unit 70, which assembles the signaling data contained in the cell. The assembled signaling data is transmitted via the bus controller 80 to the mainframe bus of the computer.

When a cell containing switching data is input to the address convertor 50, the destination of the cell is changed with reference to a table described later. The 8 ×8 switch 60 outputs the switching data to the output line $2_2$–$2_8$ according to the changed destination.

Figure 3:
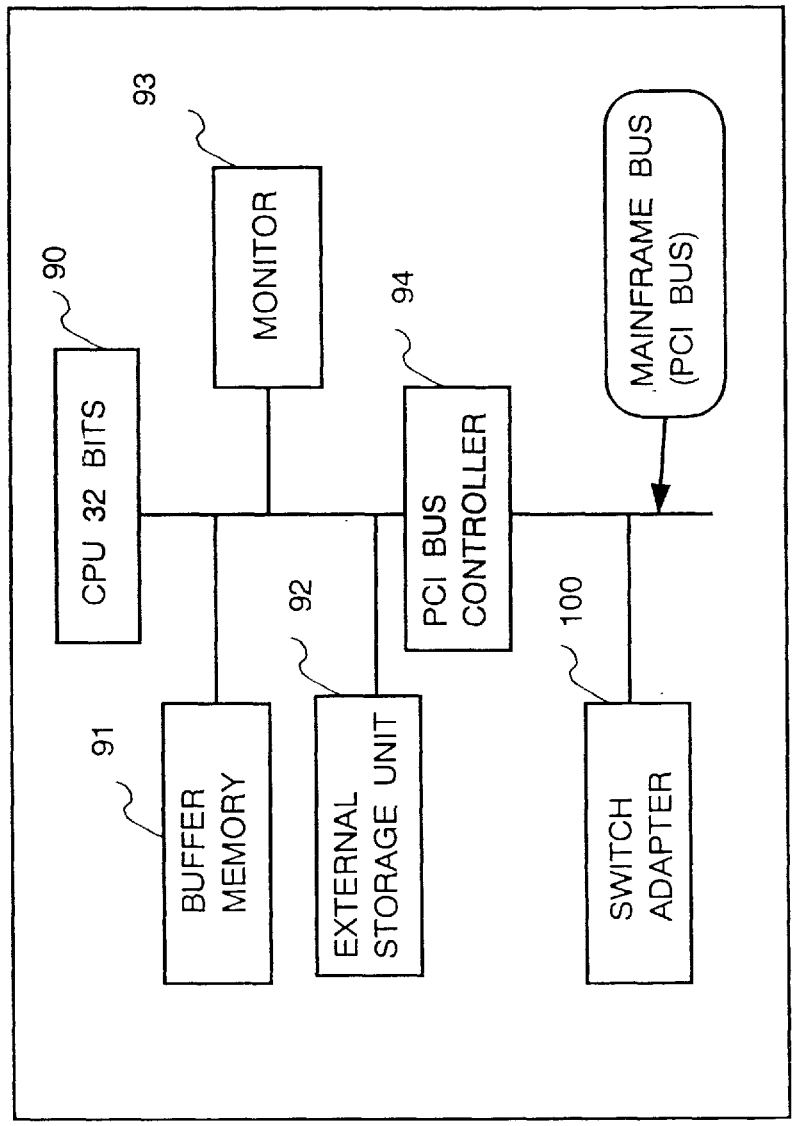
FIG. 3 shows a configuration of a computer according to this invention.

FIG. 3 shows a general purpose computer with an installed switch adapter 100.

The general purpose computer is any kind of standard computers which are manufactured not for special purpose. For example, the general purpose computer means any one of a personal computer, a work station, a mini computer, a small business computer, and a large scaled mainframe computer, which is generally traded on the market.

In FIG. 3, the computer has a 32 bit CPU 90, for instance. A buffer memory 91 and an external storage unit 92 are mounted as storage units. In addition, a monitor 93 is provided as a display unit. This equipment is connected by the mainframe bus 95. A Peripheral Component Interconnect (PCI) is utilized as the mainframe bus 95. The PCI bus 95 is extended by the PCL bus controller 94 and connected with the switch adapter 100 with a slot (not shown).

In such a configuration, access to the mainframe bus of the computer is carried out only when the control information (signaling data) of the setting, maintenance, and release of the call or connection is received. Therefore, share of the switch adapter 100 of the computer mainframe bus can be extremely lowered. Accordingly, the PCI bus 95 of the computer can implement the expected process expected to the computer mainframe without damage to the mainframe.

In case of adopting the ATM system, the virtual channel of each terminal is set in advance and the information is transferred. The service that sets the virtual channel in advance and uses the preset virtual channel is referred to as a permanent virtual channel service. The service that sets and uses the virtual channel on demand is called a switched virtual channel.

Setting, maintenance and release of the call or connection is executed during the switched virtual channel service. Accordingly, signaling data is transferred to the computer during the switched virtual channel service. On the other hand, when the management information, such as an operation administration and maintenance (OAM) cell, occurs and functions during the permanent virtual channel service as control information, such management information is transferred to the computer.

Thus, during both the permanent virtual channel service and the switched virtual channel service, data transferred to the computer is limited. The PCI bus 95 of the computer is not influenced by the switch adapter 100 information.

Figure 4:
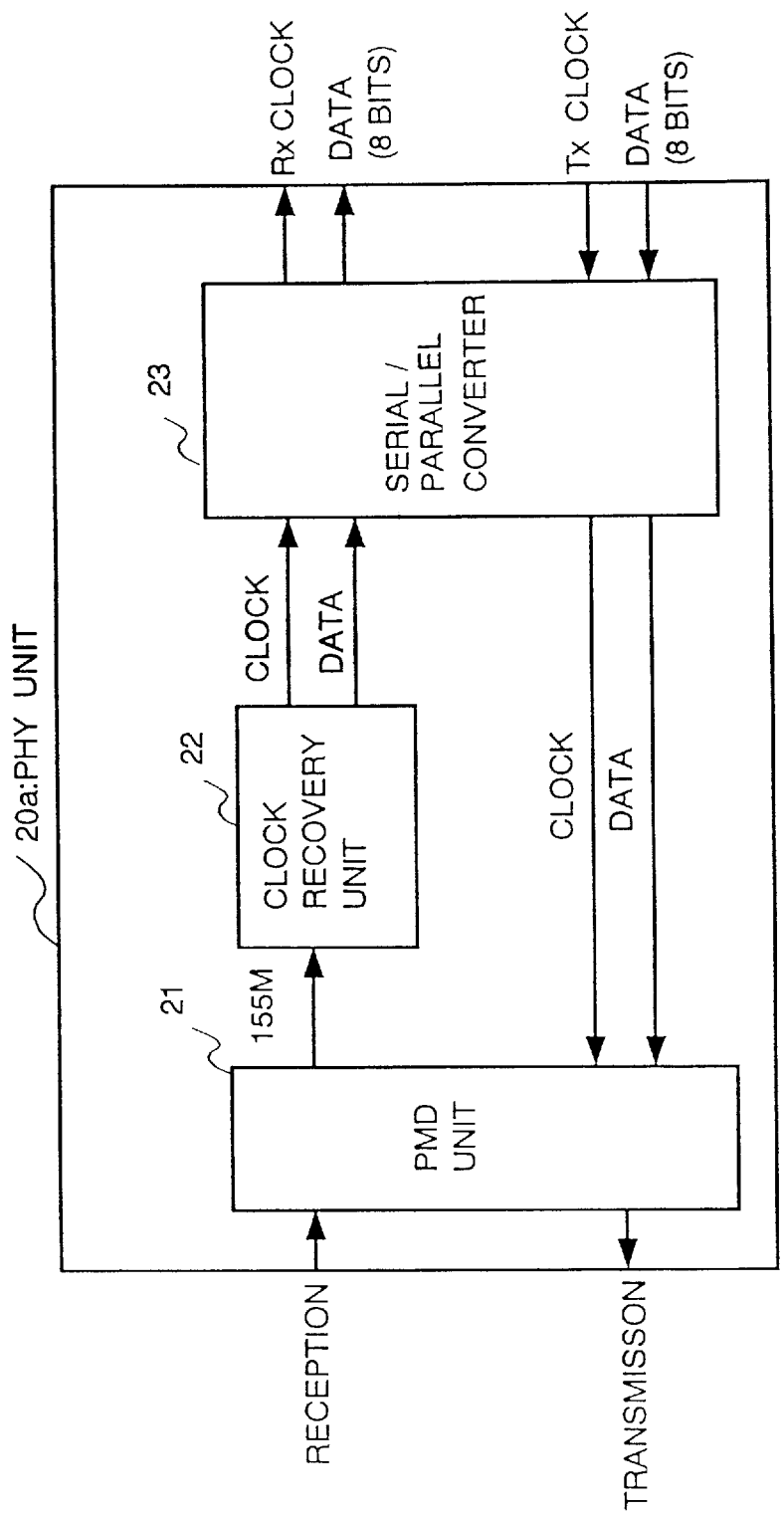
FIG. 4 shows a view of a PHY unit according to this invention.

FIG. 4 shows a block diagram of a PHY unit 20a.

PHY units 20b to 20g have the same configuration as the PHY unit 20a. A Physical Medium Dependent (PMD) unit 21 physically interfaces an impedance with the communication line using a modular-type connector. Various types of communication lines can be used for this configuration, such as optical fibers or coaxial cables. Various types of modular-type connectors, such as RJ 11 or RJ 45 are utilized.

The receiving signal is a signal coded by a non return zero (NRZ) code or a 16-CAP code. In the receiving signal, a clock for synchronizing the signal is coded. The PMD unit 21 transfers the receiving signal to a clock recovery unit 22.

The clock recovery unit 22 divides the receiving signal into clock and data and transfers a serial/parallel convertor 23. By separating the clock by the clock recovery unit 22, it is possible to carry out the reception synchronized with the data having a speed of 155 megabit per second. A serial/parallel convertor 23 converts the input serial signal into a parallel signal. The serial/parallel convertor 23 outputs 8 bits of parallel data with the receiving clock information to the TC/ATM control unit 30a, forming a frame formation composed of cells.

The serial/parallel convertor 23 also inputs the transmitting clock information and 8 bits of parallel data from the TC/ATM control unit 30a. The 8 bits of parallel data are converted to the serial data. The serial/parallel convertor 23 sends a transmitting clock and the transmitting serial data to the PMD unit 21. The PMD unit 21 physically interfaces with the communication line, transmitting data to it.

Figure 5:
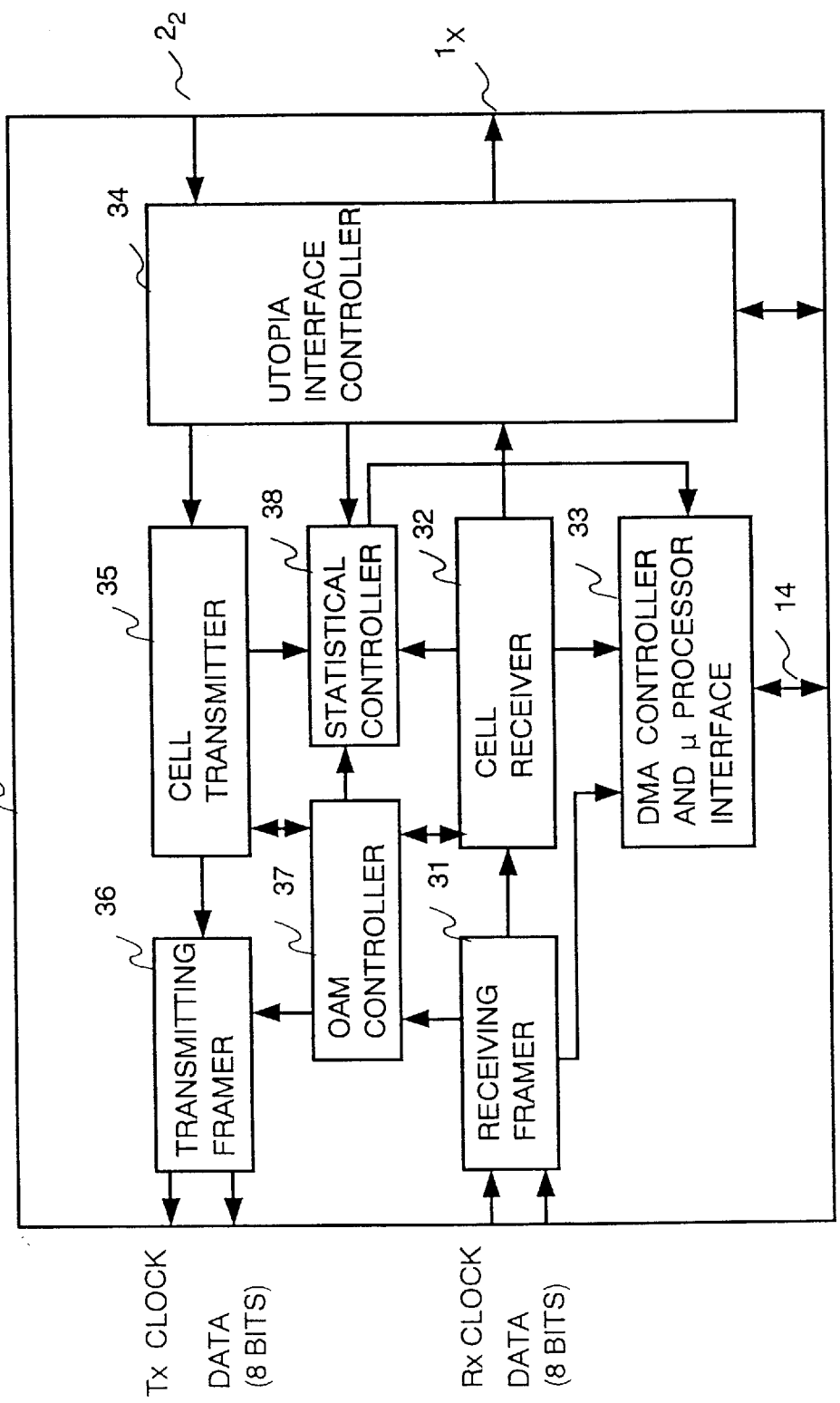
FIG. 5 shows a view of a TC/ATM control unit according to this invention.

FIG. 5 illustrates the TC/ATM control unit 30a.

The clock and the parallel data transferred from the PHY unit 20a are received at a receiving framer 31. The received parallel data is in the frame formation, and is composed of a plurality of cells. The receiving framer extracts cells included in the frame and transfers them to a cell receiver 32. The cell receiver 32 transfers the cells, via an UTOPIA interface controller 34 and a connection line $1_x$, to the address convertor 50a.

The cell switched from the 8×8 switch 60 is input into the UTOPIA interface controller 34 of the TC/ATM control unit 30a via the outgoing line $2_2$. The input cell is then transferred to a cell transmitter 35. The cells, via the cell transmitter 35, are transmitted to a transmitting framer 36 and reassembled into the frame formation. The cells and a transmitting clock are transmitted from the transmitting framer 36 to the PHY unit 20a. The cells are transmitted as 8 bits of parallel data.

When the cells received by the receiving framer 31 are OAM cells, the receiving framer 31 transfers the received OAM cells to an OAM controller 37. The OAM controller 37 transfers the management information of the received OAM cells to a statistical controller 38. The statistical controller 38 sums up the information necessary for maintenance operation, such as the quality of the network or detection of a network disorder, based on the management information. The OAM controller 37 and the statistical controller 38 switch information in the cell receiver 32, UTOPIA interface controller 34 and the cell transmitter 35 so as to collect and transfer the information required for the maintenance operation.

The OAM controller 37 either inserts the OAM cell between the series of cells having user information on demand or periodically. The OAM cell is inserted by the OAM controller 37, which controls the transmitting framer 36 and the cell transmitter 35.

The operation of each element of the TC/ATM control unit 30a is controlled by a Direct Memory Access (DMA) controller and a microprocessor interface 33. The DMA controller and the microprocessor interface 33 are controlled by the CPU 10 via the bus 14 in the board.

Figure 6:
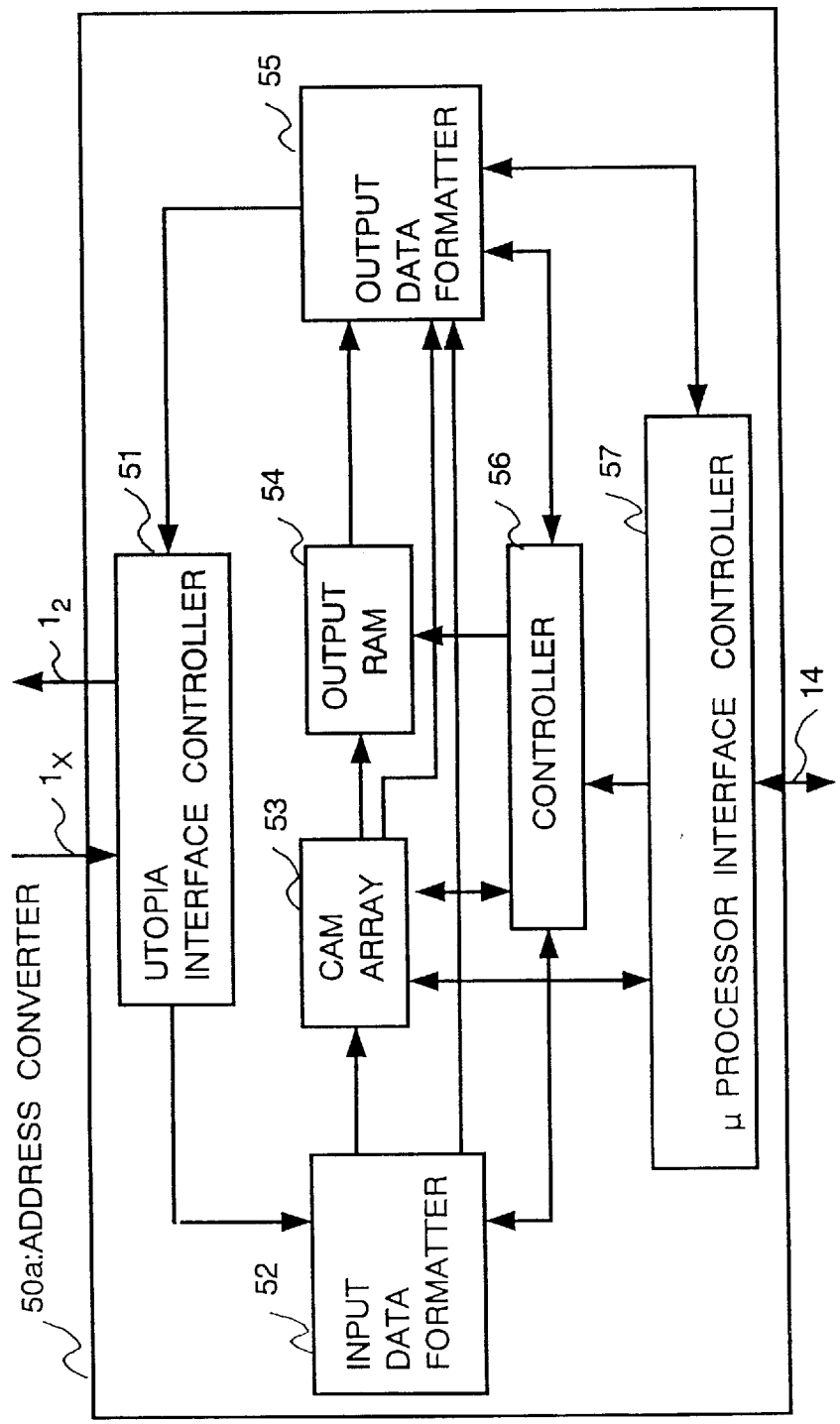
FIG. 6 shows a view of an address convertor according to this invention.

FIG. 6 illustrates the address convertor 50a.

The address convertor 50a receives cells from the TC/ATM control unit 30a, through the connection line $1_x$. The address converter 50a rewrites the header address of the received cell. The cell whose address is rewritten is output to the input line $1_2$. The address convertor 50a has an UTOPIA interface controller 51 to input and output cells. The received cell is analyzed by the input data formatter 52. The input data formatter 52 extracts a VCI (virtual channel identifier) from the header of the received cell and outputs this VCI to a CAM array 53. The CAM array 53 is a table as shown in FIG. 7. A corresponding, new VCI is output to an output RAM 54, based on the input VCI. The output RAM 54 then outputs the new VCI to an output data formatter 55. After analyzed by the input data formatter 52, the elements of the received cell, except for the VCI, are output to the output data formatter 55. The output data formatter comprises the cell output by the input data formatter and the new VCI output from the output RAM 54. The comprised cell is output to the UTOPIA interface controller 51.

A controller 56 controls the operation of the address converter 50a. The controller 56 controls each element under the control of the CPU 10 through a microprocessor interface controller 57.

The address convertor 50a is characterized by the table stored on the CAM array 53 as shown in FIG. 7. A new VCI for the signaling data is set at the outgoing line $2_1$ in the first row on the table. In the network, the signaling data utilizes a specific VCI (VCI=01, for example). Accordingly, when the VCI of the received cell shows the signaling data (VCI=01), the CAM array 53 outputs the VCI corresponding to the output line $2_1$ (VCI=01, for example) as the new VCI to be output.

Thus, the signaling data is changed to the cell whose destination is necessarily the output line $2_1$. The 8×8 switch 60 need not judge whether the input data is the signaling data. The 8×8 switch 60 executes only the switching of the cell, without discriminating the usual data from the signaling data. In the address convertor 50a, the VCI is changed in advance in order to set the address of the signaling data to be the outgoing line $2_1$.

Figure 8:
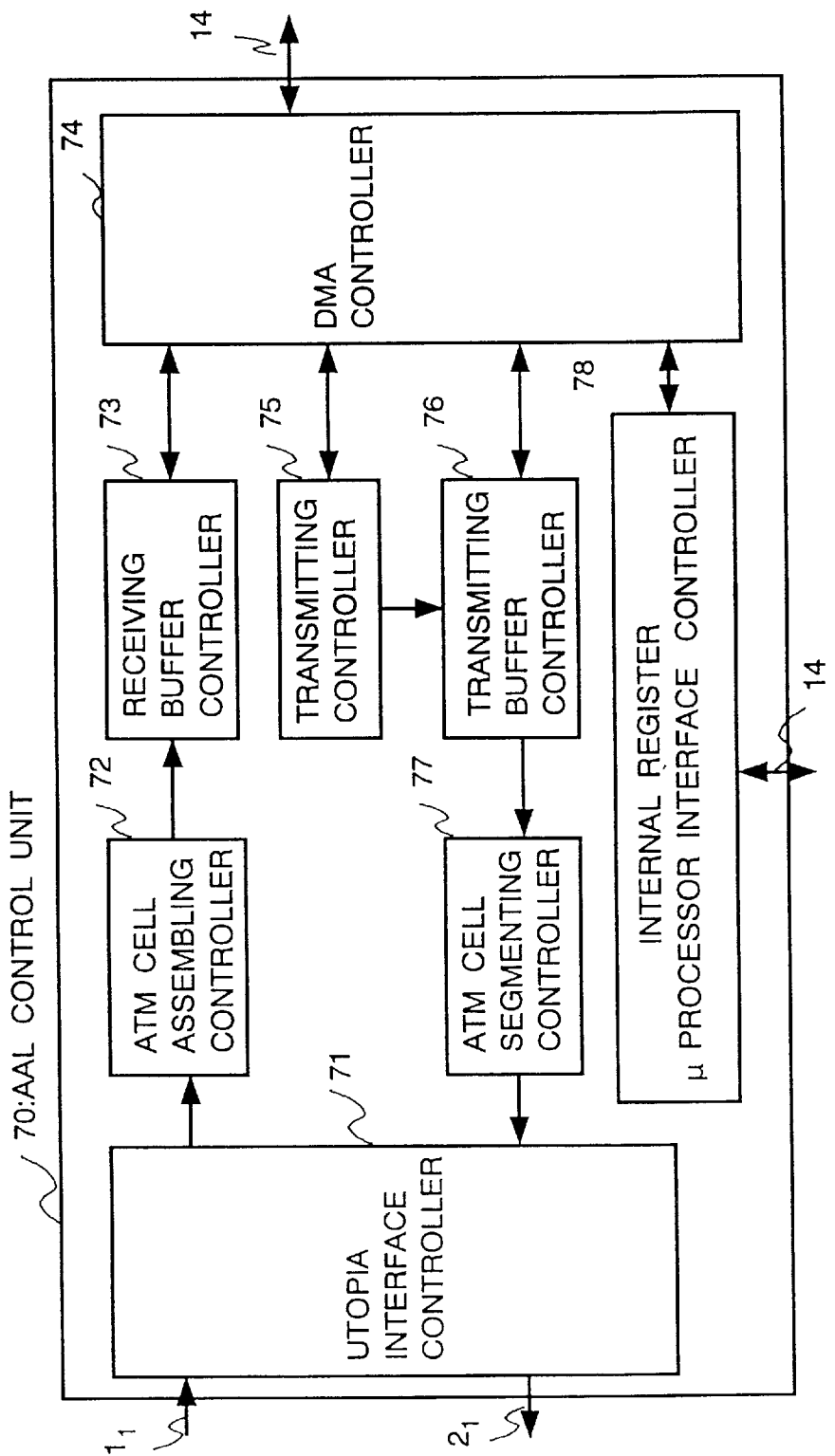
FIG. 8 shows an AAL control unit according to this invention.

FIG. 8 illustrates the AAL control unit 70.

The AAL control unit 70 is connected to the incoming line $1_1$ and the outgoing line $2_1$ through the UTOPIA interface controller 71.

An ATM cell assembling controller 72 assembles cells and outputs a data unit. The assembled cells, or data unit, is transmitted to a receiving buffer controller 73. The receiving buffer controller 73 processes the data unit using methods, such as delay control, swinging control, error control and flow control. The DMA controller 74 executes DMA transfer of the processed data unit to the RAM 11.

The DMA controller 74 extracts the information stored in the RAM 11 and transfers it to a transmitting buffer controller 76. The transmitting buffer controller 76 performs error control and flow control on the information received from the DMA controller under the control of the transmitting controller 75. An ATM cell segmenting controller 77 segments the information or the data from the transmitting buffer controller 76 into cells.

The DMA controller 74 performs the DMA transfer through a microprocessor interface controller 78 under the control of the CPU 10.

Figure 9:
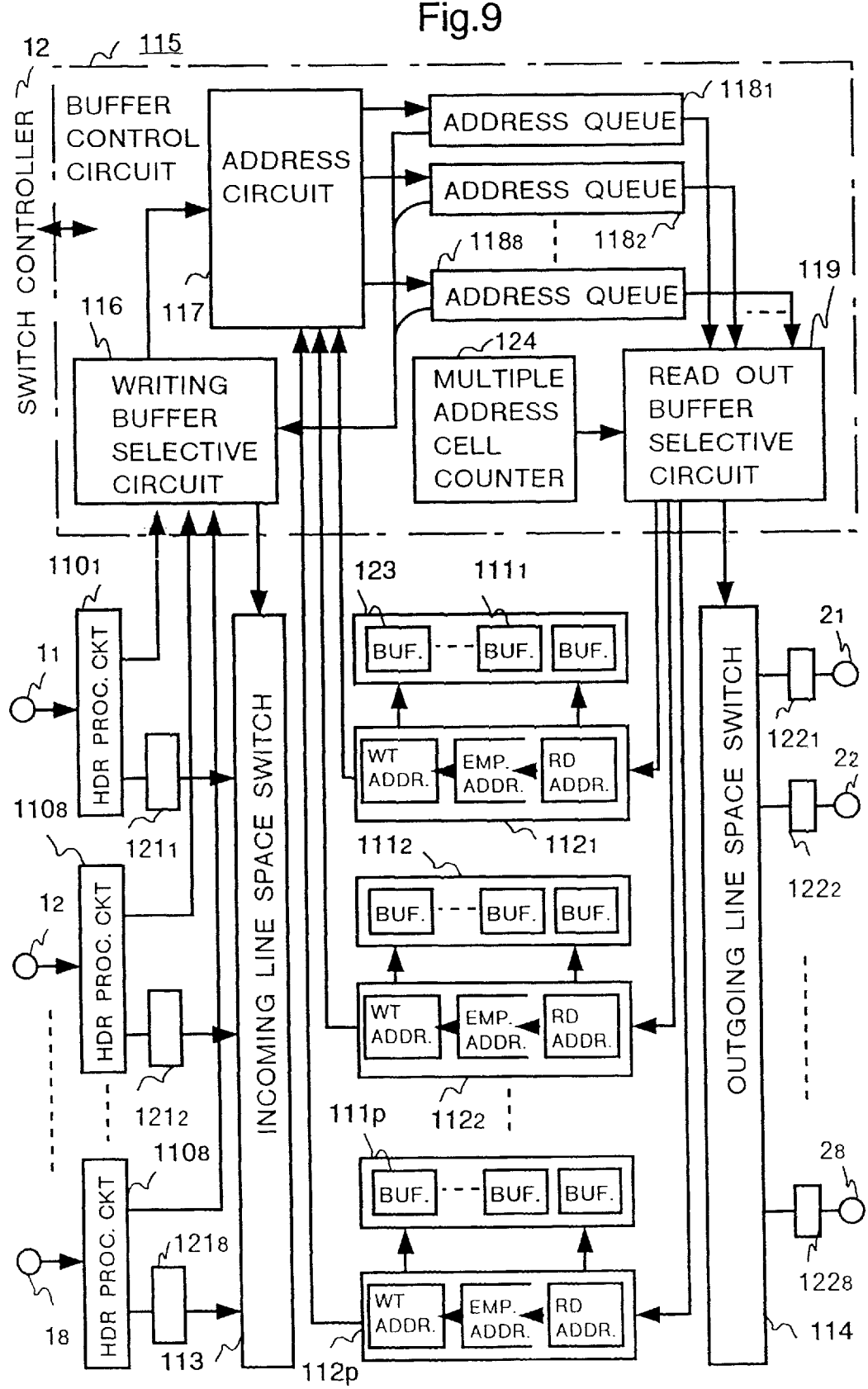
FIG. 9 shows an ATM switch unit according to this invention.

FIG. 9 illustrates the 8×8 switch 60.

The cell comprising the header unit and the data unit, including destination information, is input to input lines $1_1$ to $1_8$. The cell is then output, corresponding to the destination indicated on its header, to output lines $2_1$ to $2_8$. Header processing circuits $110_1$ to $110_8$ detect output lines $2_1$ to $2_8$ which are regarded as the destination by the header units of the cells input from each of input lines $1_1$ to $1_8$.

Input line speed adjustment buffers $121_1$ to $121_8$ are provided for each incoming line to perform speed adjustment, by storing and reading out the cells output from the header processing circuits $110_1$ to $110_8$.

In p number of buffer memories $111_1$ to $111_p$, each of which has memory numbers #0, #1, . . . , #p, the cell is stored in the indicated address. By indicating the address, the buffer memories $111_1$ to $111_p$ can read out the cell stored without a writing order.

Storage control circuits $112_1$ to $112_p$ are provided corresponding to each of the buffer memories $111_1$ to $111_p$. The storage control circuits $112_1$ to $112_p$ maintain empty addresses by using the First in First Out (FIFO) type memory and storing the incoming cells in the addresses of the corresponded buffer memory 111.

An input line space switch 113 selectably connects input line speed adjustment buffers $121_1$ to $121_8$ to each of buffer memories $111_1$ to $111_p$. An output line space switch 114 which selectably connects each of buffer memories $111_1$ to $111_p$ to speed adjustment buffers $122_1$ to $122_8$, corresponding to a fixed output line $2_1$ to $2_8$.

Output line speed adjustment buffers $122_1$ to $122_8$ are provided for the output lines $2_1$ to $2_8$. The output line speed adjustment buffers $122_1$ to $122_8$ store the cells read out by the buffer memories $111_1$ to $111_p$ and connected by the output line space switch 114. Then, the output line speed adjustment buffers read out the cell at the output line speed in order to adjust the speed.

A buffer control circuit 115 selects the buffer memories $111_1$ to $111_p$ to store the cells, by controlling switching of the input line space switch 113 and switching of the output line space switch 114. The buffer control circuit 115 outputs the cells stored in the buffer memories $111_1$ to $111_p$ in a fixed order to the output line $2_1$ to $2_8$ indicated by the header unit.

In the buffer control circuit 115, a writing buffer selective circuit 116 controls switching of the input line space switch 113 in order to determine which outgoing line the cell is destined for. This cell destination is detected at the arrival of the cell at the header processing circuits $110_1$ to $110_8$ and corresponds to the input lines $1_1$ to $1_8$. The writing buffer selective circuit 116 selects the buffer memories $111_1$ to $111_p$ that will store the cell and connect it to the switch header processing circuits $110_1$ to $110_8$.

An address circuit 117 identifies the destination of the arrived cells, by referencing the output line sent from the writing buffer selective circuit 116. The address circuit 117 gets the write address on the buffer memories $111_1$ to $111_p$, on which the cell is written, from the storage control circuits $112_1$ to $112_p$. The address circuit 117 then writes the write address of the destination on the address queues $118_1$ to $118_8$.

The address queues $118_1$ to $118_8$ are provided for each of the output lines $2_1$ to $2_8$ and are configured by the FIFO-type memories. The addresses stored in the buffer memories $111_1$ to $111_p$ are written into the address queues $118_1$ to $118_8$ by an address circuit 117.

A multiple address cell counter 124 has an area in which the number of multiple address cells to be read out is written. The multiple address cell stored in one buffer memory $111_1$ to $111_p$ is output with copied on a plurality of destinations. When the multiple address cell is read out, the value of the multiple address cell counter 124 is decreased by one. When the multiple address cells are output to the plurality of destinations, the timing point of releasing the buffer can be obtained.

A read out buffer selective circuit 119 uses the address queues $118_1$ to $118_8$ and the multiple address cell counter 124 to determine which cells to read out from the buffer memory $111_1$ to $111_p$. The read out buffer selective circuit 119 directs the buffer address, which is read out from the address queues $118_1$ to $118_8$, to the buffer memory as the read address. Then, the read out buffer selective circuit 119 controls the connection of the buffer memories $111_1$ to $111_p$ to the output line speed adjustment buffers $122_1$ to $122_8$ accompanied with the corresponding output line $2_1$ to $2_8$ by controlling the switching of the output line space switch 114. The read out buffer selective circuit 119 further subtracts, by one, the value of the multiple address cell counter 124 that corresponds to the read out address. When the value of the multiple address cell counter 124 becomes zero, the address is released to the storage control circuits $112_1$ to $112_p$.

Figure 10:
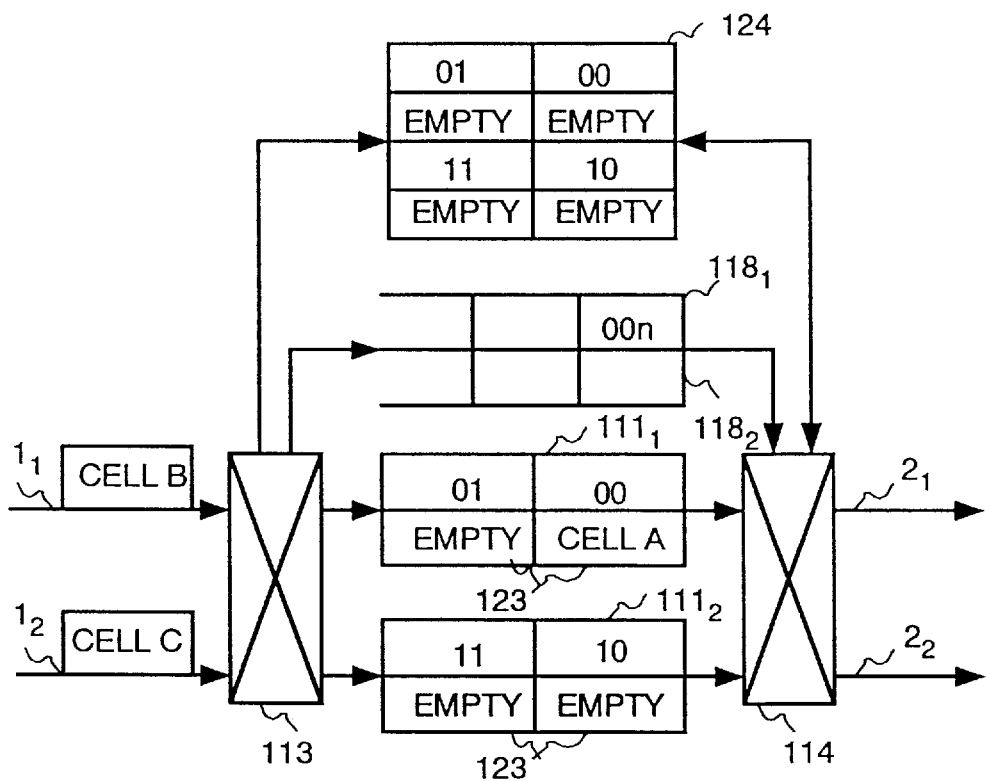
FIG. 10 shows an operation of the ATM switch according to this invention.
Figure 11:
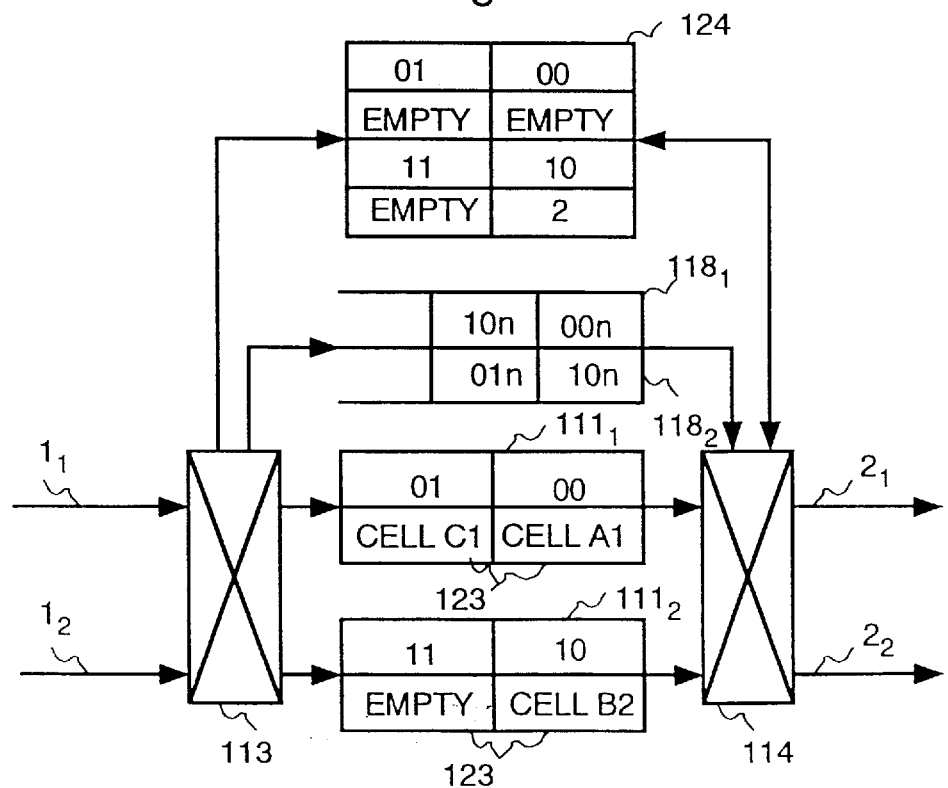
FIG. 11 shows an operation of the ATM switch according to this invention.
Figure 12:
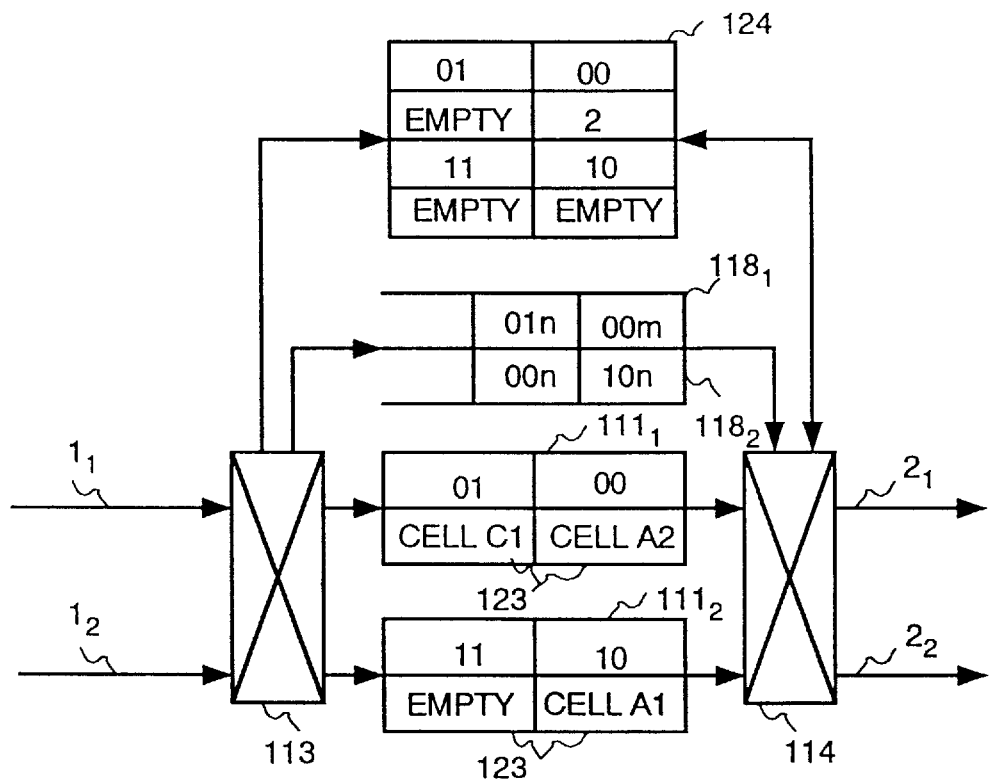
FIG. 12 shows an operation of the ATM switch according to this invention.
Figure 13:
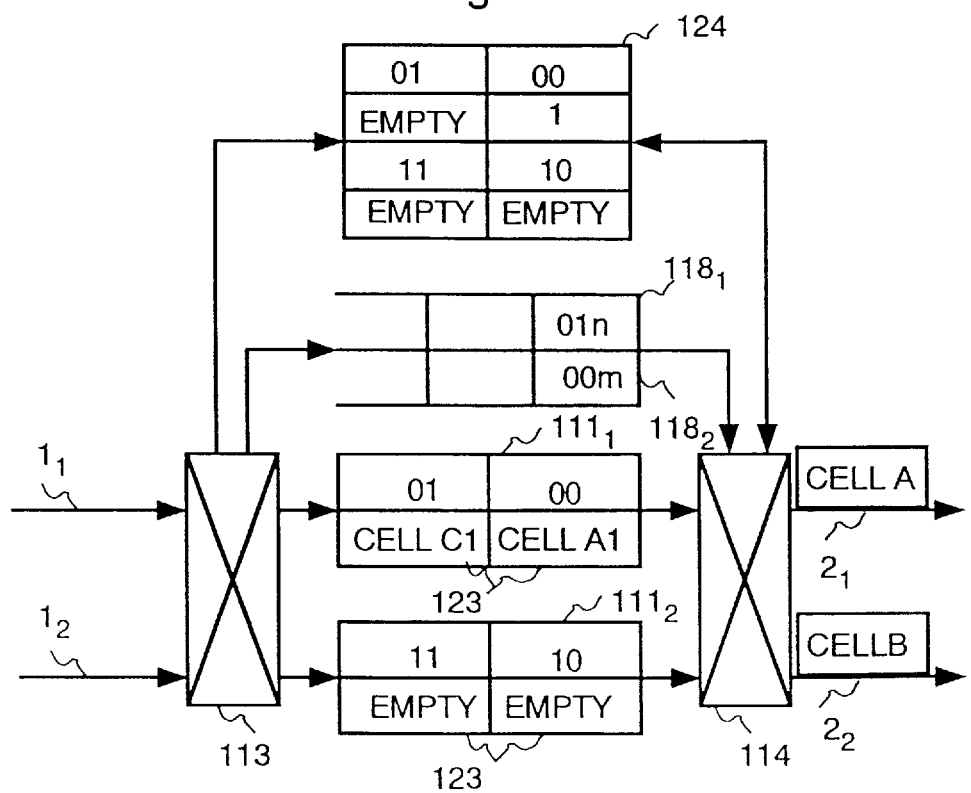
FIG. 13 shows an operation of the ATM switch according to this invention.

The operation will now be described with reference to FIGS. 10 to 13. FIGS. 10 and 11 illustrate the writing operation, while FIGS. 12 to 13 illustrate the read out operation. Both of them show a case of a 2×2 switch for a simplified explanation.

FIGS. 10 and 11 show the operation in a case where a cell A is stored in advance in the buffer "00" and a multiple address cell B, whose destinations are the output lines $2_1$ and $2_2$, and a cell C, whose destination is the output line $2_2$, are input. A cell B is written on an empty address "10" and simultaneously address "10" is written on the address queues $118_1$ and $118_2$ corresponding to the destination output lines $2_1$ and $2_2$. The number of destination output lines "2" is written on the area of "10" of the multiple address cell counter 124. A cell C is written on an empty address 01 and simultaneously address "01" is written on the address queue $118_2$.

FIGS. 12 and 13 show the operation in a case where the cells A and B are read out when a multiple address cell A and non-multiple address cells B and C are stored. From the head of the address queues $118_1$, $118_2$, read out addresses "00", "10" are read out. Then, the cells A and B stored in the address are output to an output line for read out, respectively. Since the cell B is a non-multiple address cell, once the cell is read out, the buffer can be released and the next input cell can be stored. However, since the cell A is a multiple address cell, after the subtraction from the value of address "00" of the multiple address cell counter 124, the value consequently becomes "1". Therefore, the cell A is held and the buffer is not released. When the value of the multiple address cell counter 124 becomes "0", the address is released and the input cell comes is writable.

The operation of reception according to this embodiment will now be described with reference to FIG. 14.

At S1, the PMD unit 21 receives the coded signal based on the NRZ code or the 16-CAP code. The PMD unit 21 converts the received signal into serial data of Pseudo-Emitter Coupled Logic (P-ECL).

At S2, the serial data of P-ECL is input into the clock recovery unit 22 and the clock is extracted from the serial data of P-ECL. Thus, the receiving clock and the receiving serial data are output from the clock recovery unit 22.

At S3, the receiving clock and the receiving serial data are input to the serial parallel convertor 23. The receiving serial data is converted to parallel data, based on the receiving clock.

At S4, the received parallel data is input in the receiving framer 31. The frame is extracted from the received parallel data output by the receiving framer 31.

At S5, the frame is input to the cell receiver 32. The cell receiver 32 extracts the cells included in the frame and outputs them.

At S6, the cells are input into the address convertor 50$a$. The address convertor 50$a$ switches the address (VCI) on the cell header.

At S7, the cell whose header was switched at the address convertor 50$a$ is input into the 8×8 switch 60. When the cell holding the user information is input, the 8×8 switch 60 outputs the cell to an output port (output line) according to the destination. When the 8×8 switch 60 inputs the signaling cell, the cell is output to the AAL control unit 70.

Figure 15:
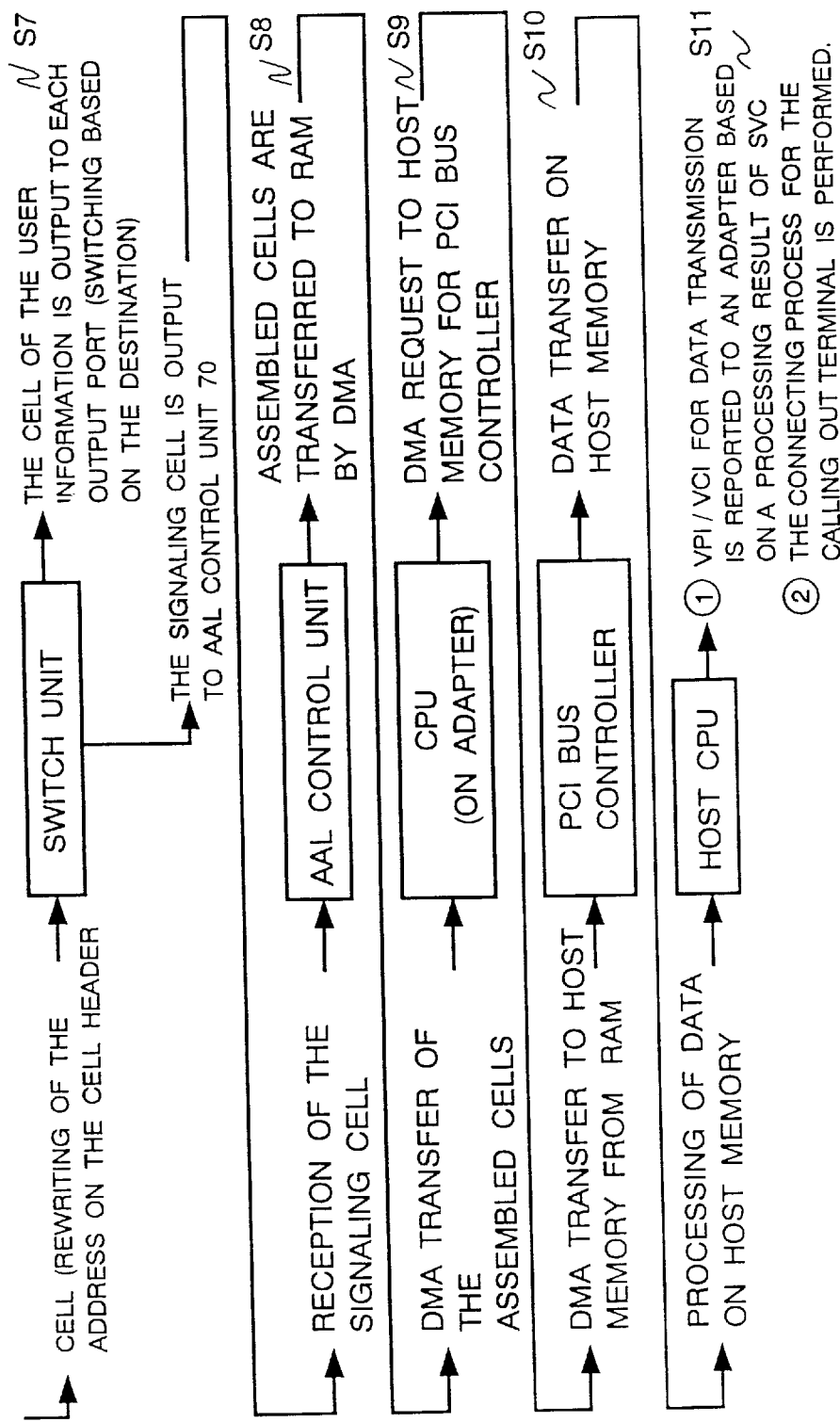
FIG. 15 shows a receiving operation according to this invention.

FIG. 15 shows the receiving operation when the signaling data cell is received.

Figure 14:
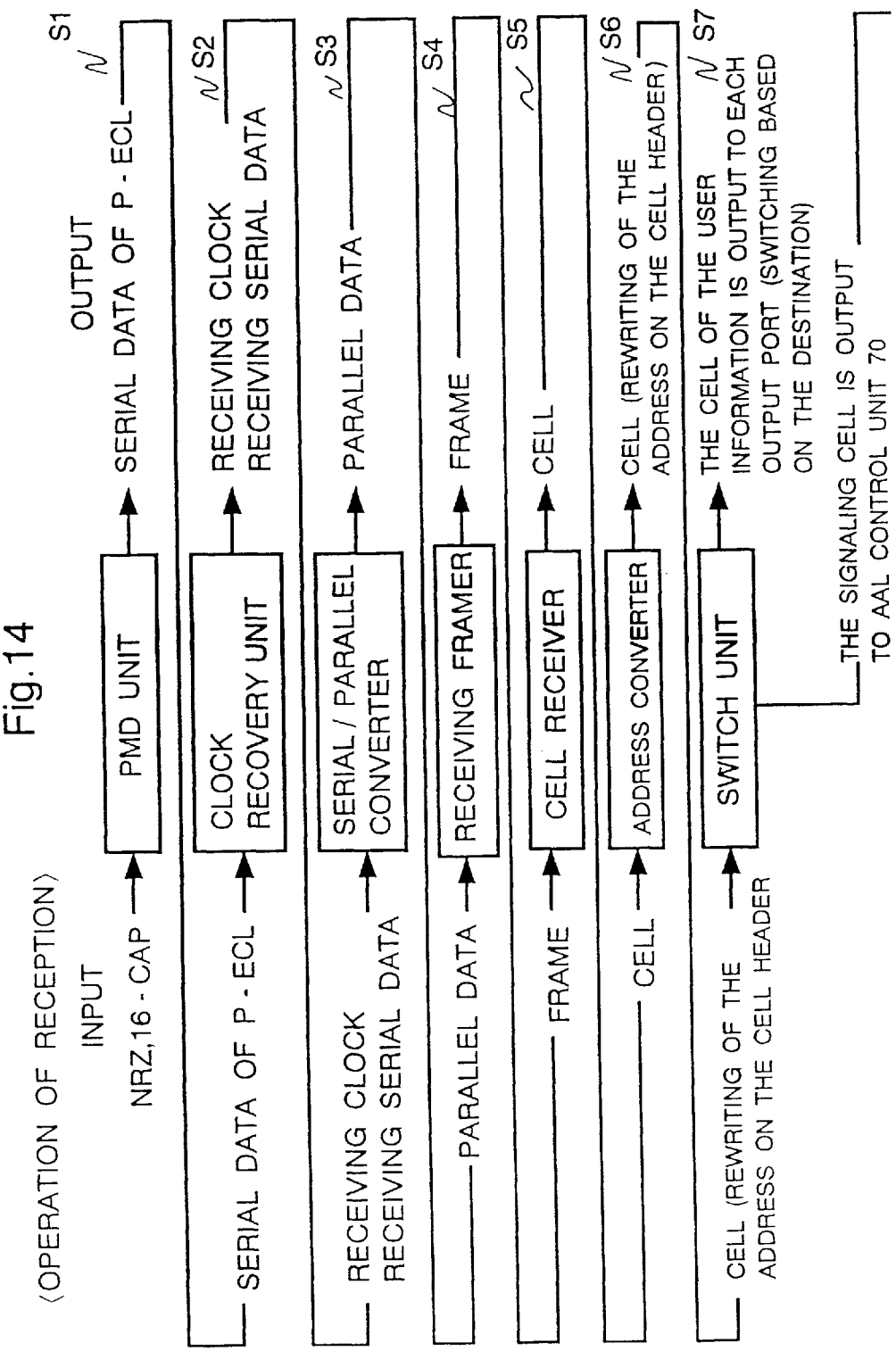
FIG. 14 shows a receiving operation according to this invention.

The operation at S7 is equivalent to that of FIG. 14.

At S8, the AAL control unit 70 receives the signaling cells. The AAL control unit 70 assembles cells to a data unit from the signaling cells and the data unit is transferred to the RAM 11, according to DMA transfer.

At S9, the CPU 10 of the switch adapter 100 outputs the DMA transfer requirement of the cells, stored in the RAM 11, to the PCI bus controller 94 provided for the mainframe bus 95 of the computer.

At S10, the PCI bus controller 94 transfers information stored in the RAM 11 to a host memory 91.

At S11, a CPU 90 in the computer carries out two processes.

(1) Processing results of the switched virtual channel service are reported to the switch adapter 100. This report is sent to the CAM array 53 of the address convertor 50$a$ as an addition or deletion indication of VPI/VCI. When the new call is set according to the processing result of the switched virtual channel service, the VCI used for the call is set on the table of the CAM array 53. As shown in FIG. 7, the information that "when the VCI of input cell is 13, the VCI is rewritten into 24" is newly added to the CAM array 53. In a case where the call is extinguished or released, as shown in FIG. 7, the information that "when VCI of the input cell is 11, the VCI is rewritten to 10" on the table is deleted.

Thus, in the event that the setting or release of the call is executed, the addition or deletion of the corresponding information is performed on the CAM array 53. The computer performs indicates and controls the addition or deletion of information on the CAM array 53, based on the processing result of the signaling data.

Figure 17:
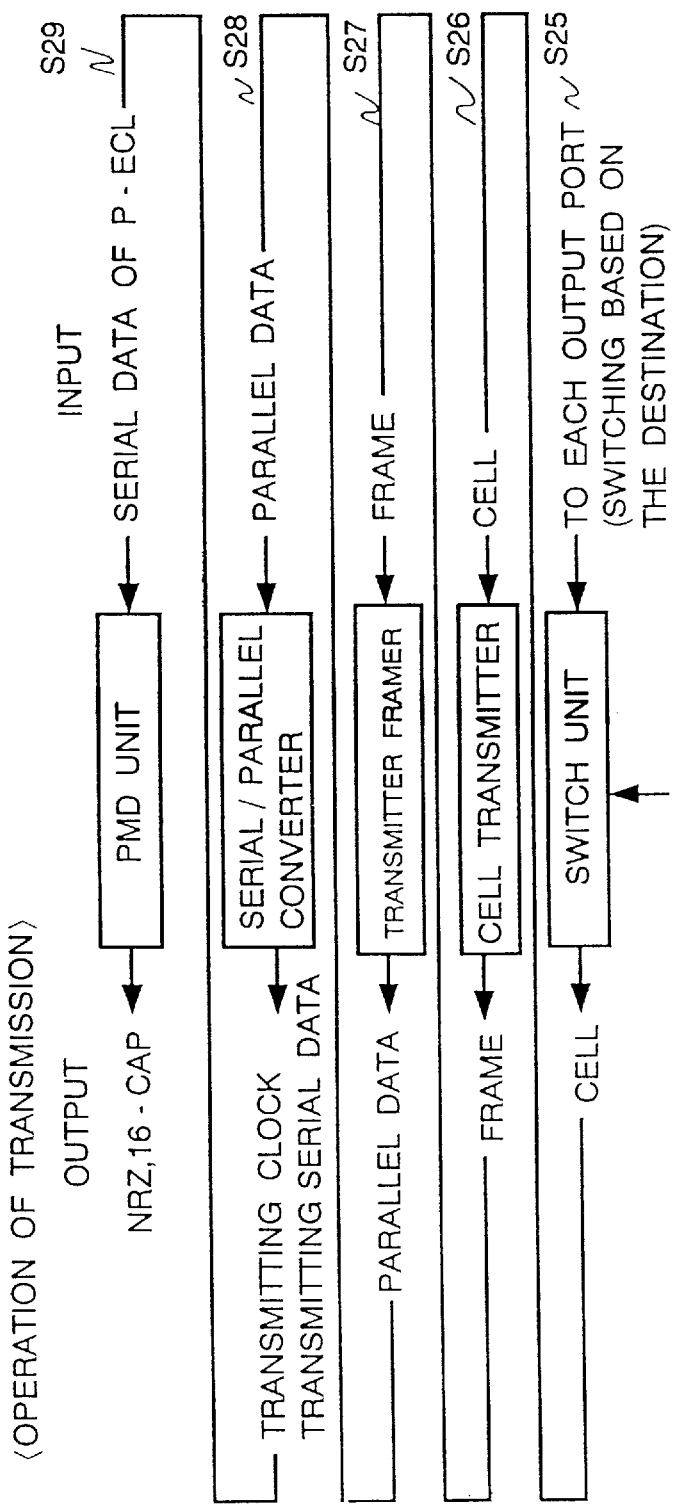
FIG. 17 shows a transmitting operation according to this invention.

(2) A computer which receives the signaling data performs the connecting process for the calling terminal. Information, which tells that the call is connected to the "calling" terminal, is generated and transferred to the "calling" terminal. FIGS. 6 and 17 refer to the transfer of the notification to the "calling" terminal that the cell is connected to. Since the disconnecting process of the call needs equivalent procedures of the connecting process, there is shown a case where the connecting process of the call is performed.

Figure 16:
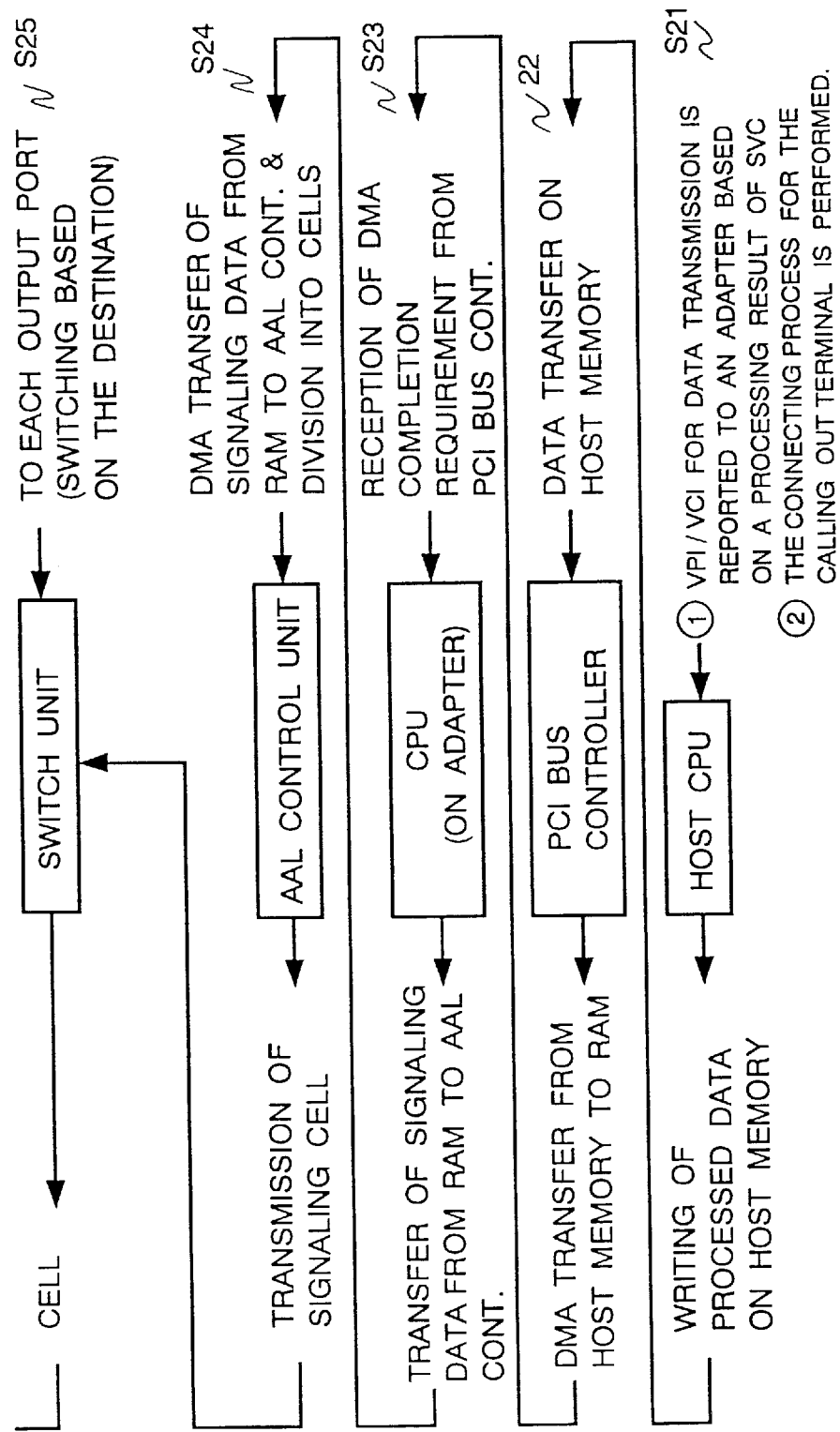
FIG. 16 shows a transmitting operation according to this invention.

FIG. 16 shows the transmitting operation of the control information (signaling data) from the computer having the switch adapter 100, to the "calling" terminal. In this operation, the setting, maintenance, and release of the call is executed based on the signaling data.

At S21, the signaling data required for the calling terminal is generated and written on the buffer memory 91.

At S22, the PCI bus controller 94 transfers the signaling data according to DMA transfer for the RAM 11 from the buffer memory 91.

At S23, the CPU 10 of the switch adapter 100 is transferred from the RAM 11 to the AAL control unit 70.

At S24, the AAL control unit 70 segments the signaling data into signaling cells.

At S25, the 8×8 switch 60 receives the signaling cells from the AAL control unit 70 through the input line $1_1$. The 8×8 switch 60 outputs the signaling cells to the communication line coupled to the "calling" terminal. The 8×8 switch 60 further switches the user information cell received from another input port (input line) and outputs it to the output port (output line) corresponding to the destination.

FIG. 17 shows the transmitting operation after the user information cell has been output by the 8×8 switch 60.

At S25, the 8×8 switch 60 outputs the signaling cells to the cell transmitter 35, through the communication line.

At S26, the cell transmitter 35 receives the cell, which is output from the 8×8 switch 60 and configures the cell into a frame format.

At S27, the frame is received by the transmitting framer 36. The transmitting framer 36 receives the frame and outputs parallel data corresponding to the frame.

At S28, the parallel data is received by the serial/parallel convertor 23. The serial/parallel convertor 23 generates the transmitting clock and converts the parallel data into the P-ECL serial data.

At S29, the P-ECL serial data is received by the PMD unit 21. The data input to the PMD unit is output as a signal based on the NRZ code or the 16-CAP code.

According to the switch adapter 100 in this embodiment, since switching the user information is performed in the switch adapter, the load to the mainframe bus can be controlled at its minimum.

Where the signaling data is both transmitted and received, the AAL control unit 70 is activated. The address convertor 50 judges reception of the signaling data. The CAM array 53 of the address convertor 50 gives initializing information necessary to identify the signaling data in advance. The address converter 50 uses the initializing information to judge the signaling data. When the signaling data is recognized, it is input into the AAL control unit 70 in its entirety by rewriting the cell header at the address convertor 50.

The initializing information, which is set in the CAM array 53, can be freely set using software or firmware by controlling and operating the switch adapter 100 through the main bus 95 of the computer.

Embodiment 2.

Figure 18:
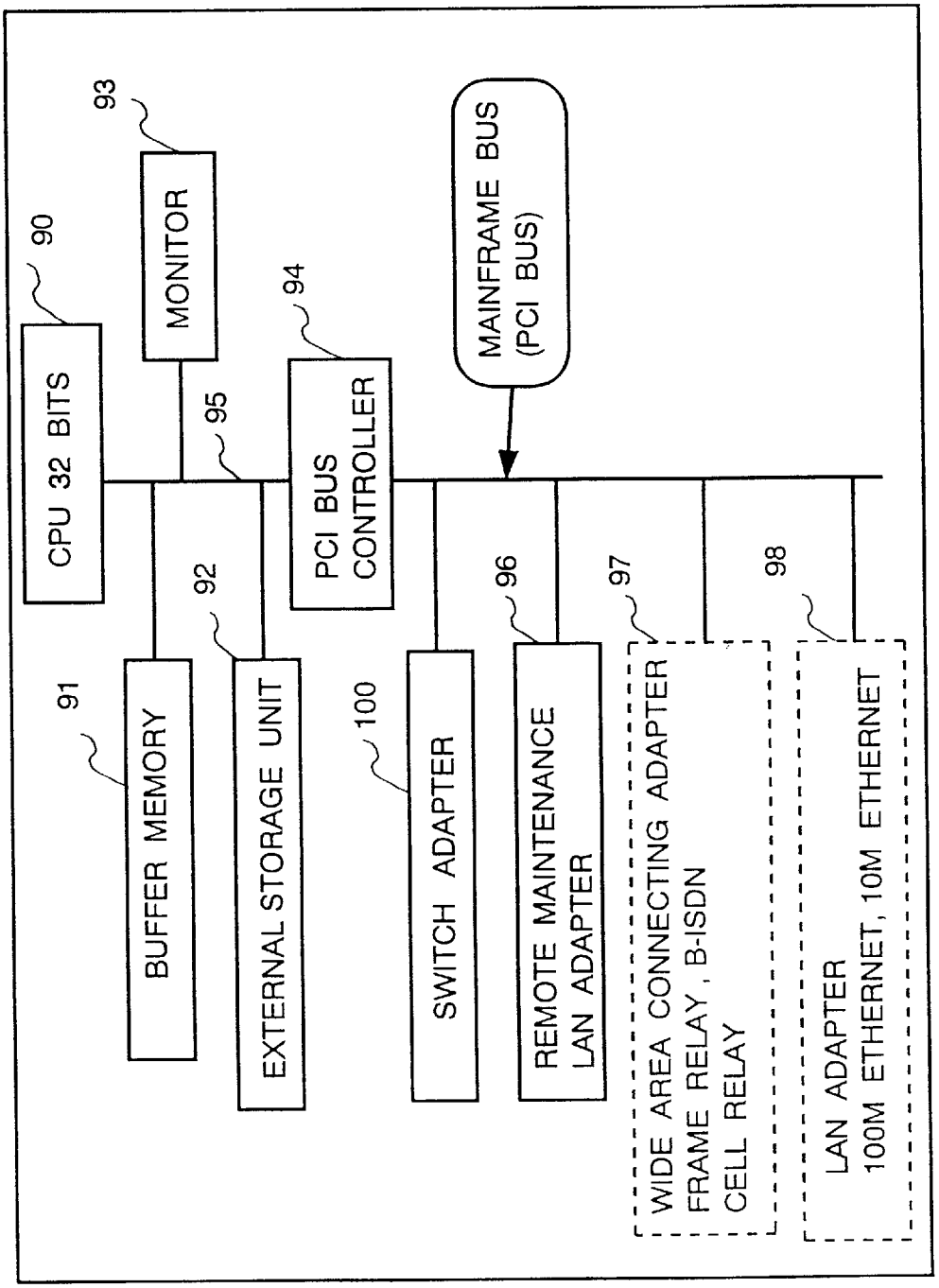
FIG. 18 shows a computer according to another embodiment of this invention.

FIG. 18 illustrates another example of the computer using the switch adapter 100.

A remote maintenance LAN adapter 96 is an adapter to connect to a local area network (not shown in the figure). Specifically, the remote maintenance LAN adapter 96 is an adapter that performs maintenance of the switch adapter 100 from a distance. The remote maintenance LAN adapter 96 checks whether the switch adapter 100 is working properly or fails. The remote maintenance LAN adapter 96 carries out remote maintenance and diagnosis and attempts to recover information when the switch adapter 100 fails.

A wide area connecting adapter 97 is an adapter used for connecting a wide area network, such as frame relay, B-ISDN and a cell relay.

A LAN adapter 98 is an adapter for connecting to a local area network, such as a 100 Mbps Ethernet or a 10 Mbps Ethernet.

The computer shown in this embodiment connects the switch adapter 100 and each type of adapters 96, 97, and 98 to the mainframe bus 95. The mainframe bus 95 uses the PCI bus, a general purpose bus which has a high generality. Only by installing each type of adapters 96, 97 and 98 on the market to the slot, the function can be utilized instantly without any development. Thus, by utilizing the switch adapter 100 combined to other adapters, the router function or bridge function can be implemented. This implementation will improve the extensibility and the flexibility in usage of the network system.

Embodiment 3.

Figure 19:
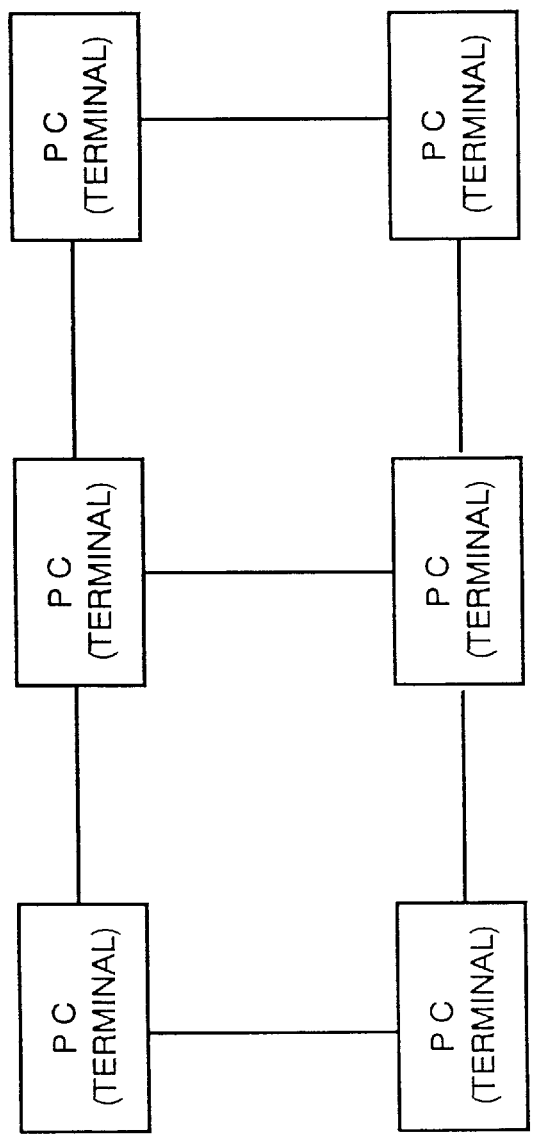
FIG. 19 shows a configuration of a network implemented according to this invention.

FIG. 19 shows a network configuration that is realized by using the computer of Embodiment 20.

Since each computer has the switching function, the network can be configured in the matrix form. Conventionally, each computer or terminal was connected centrally to one switch. In case that the computer according to this embodiment is utilized, as shown in FIG. 19, it is not needed to wire centrally to one switch, which allows the network to be configured in matrix.

Since the network may be configured in a matrix form, it is possible to change the paths or add and change computers or terminals both dynamically and easily.

Embodiment 4.

Figure 20:
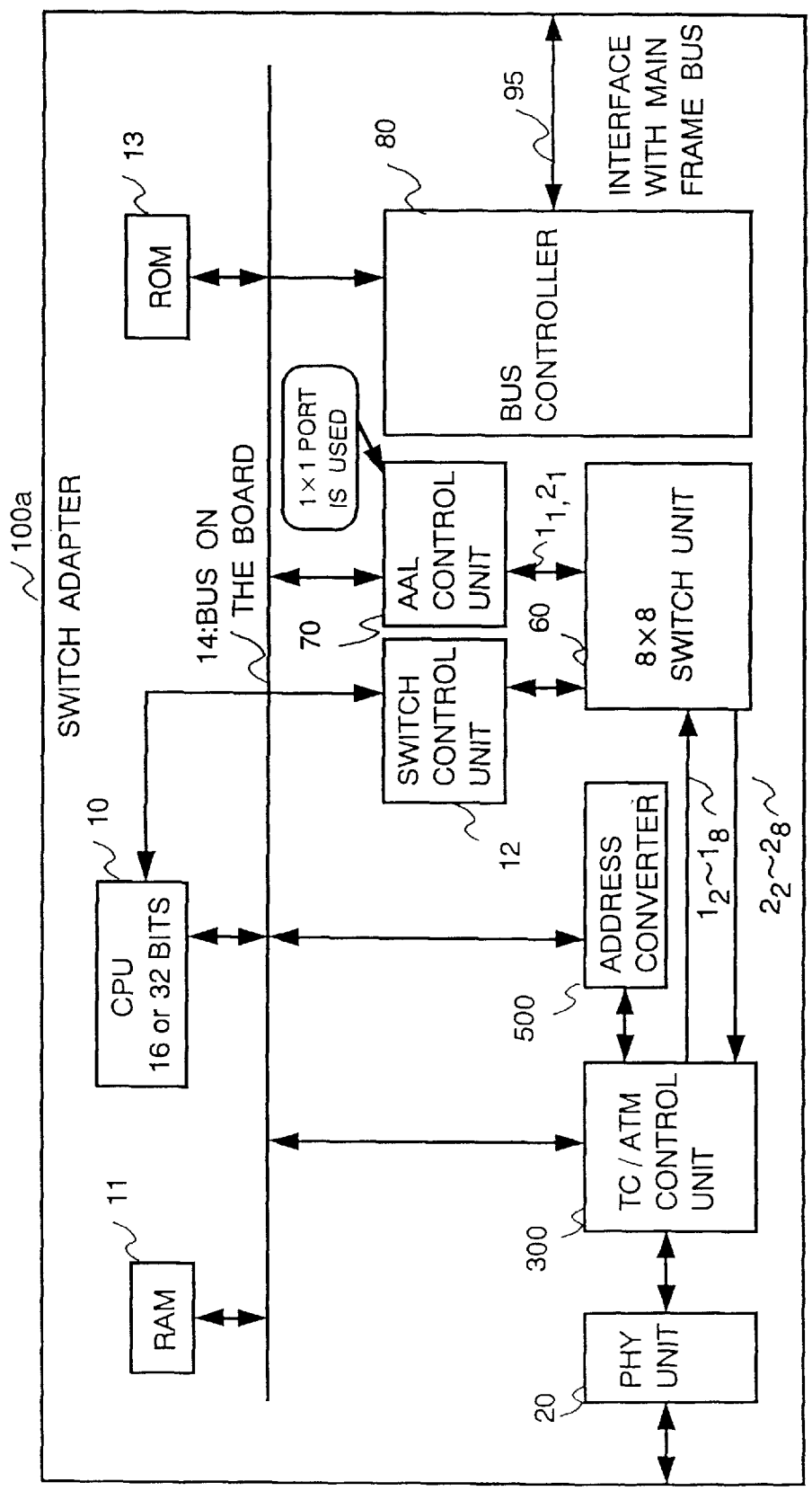
FIG. 20 shows an switch adapter according to another embodiment of this invention.

FIG. 20 shows another example of the switch adapter.

A switch adapter 100a is characterized by an address convertor 500, that has an effect on a TC/ATM control unit 300. The input cell is supplied to the address convertor 500 temporarily from the TC/ATM control unit 300. After the address convertor 500 converts the address of the input cell, the input cell is returned to the TC/ATM control unit 300. After address conversion, the TC/ATM control unit 300 directly outputs the input cell to the 8×8 switch 60. The other points are equivalent to those in the predescribed embodiments.

Embodiment 5.

FIGS. 21 to 24 show some types of the ATM switch shown on the "B-ISDN illustration reader".

Figure 21:
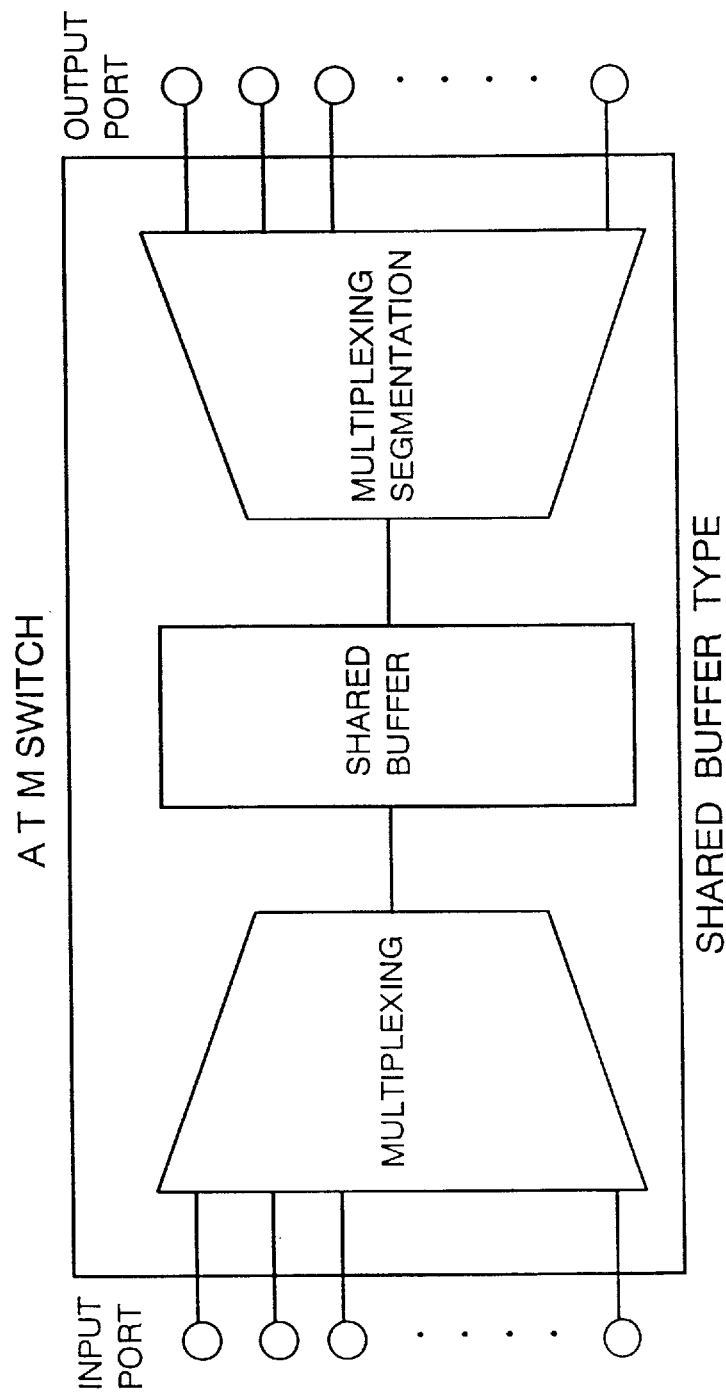
FIG. 21 shows an example of the ATM switch according to this invention.
Figure 22:
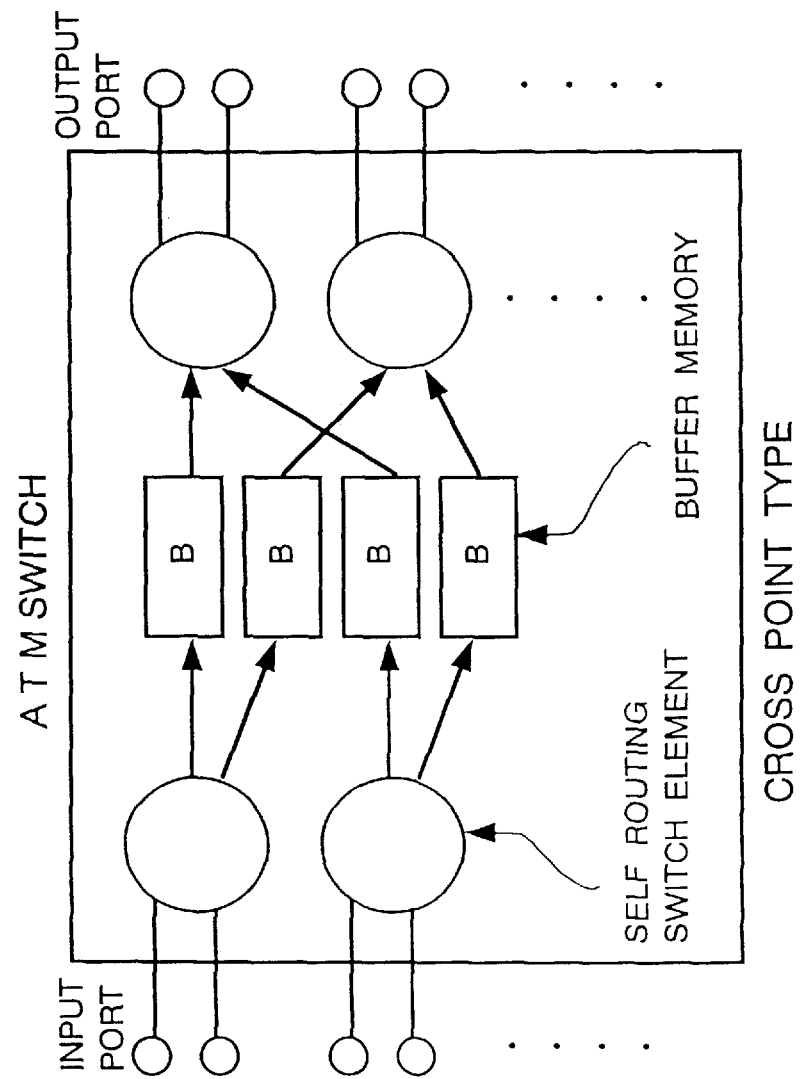
FIG. 22 shows an example of the ATM switch according to this invention.
Figure 23:
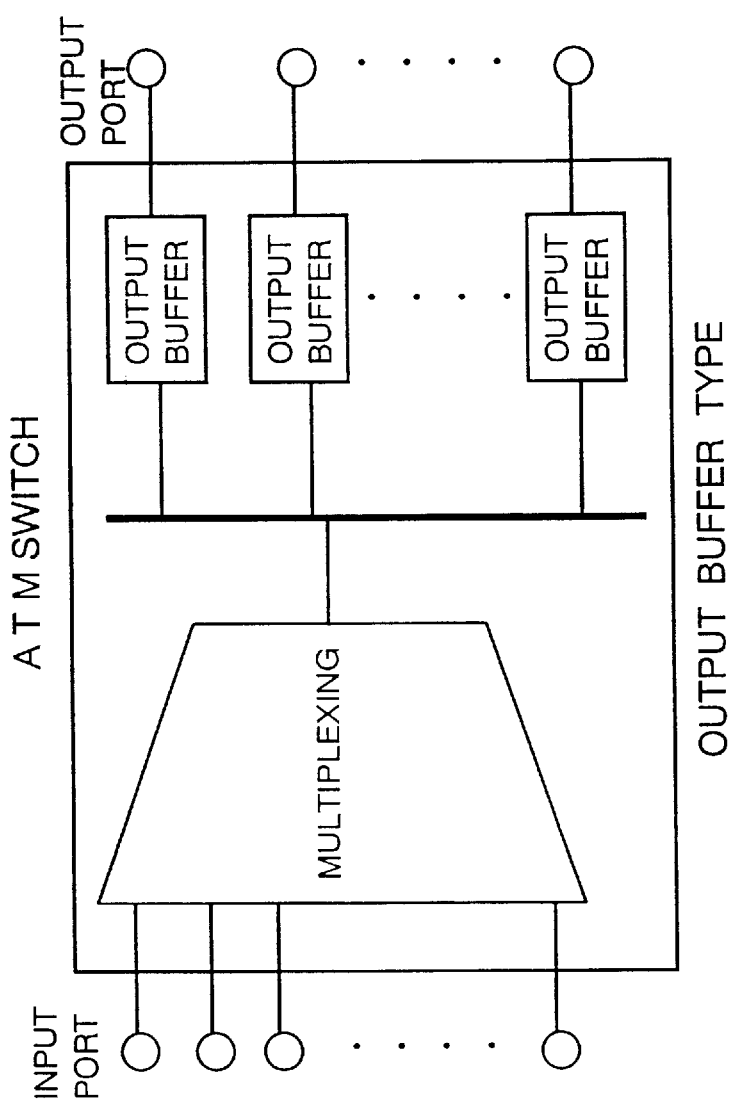
FIG. 23 shows an example of the ATM switch according to this invention.
Figure 24:
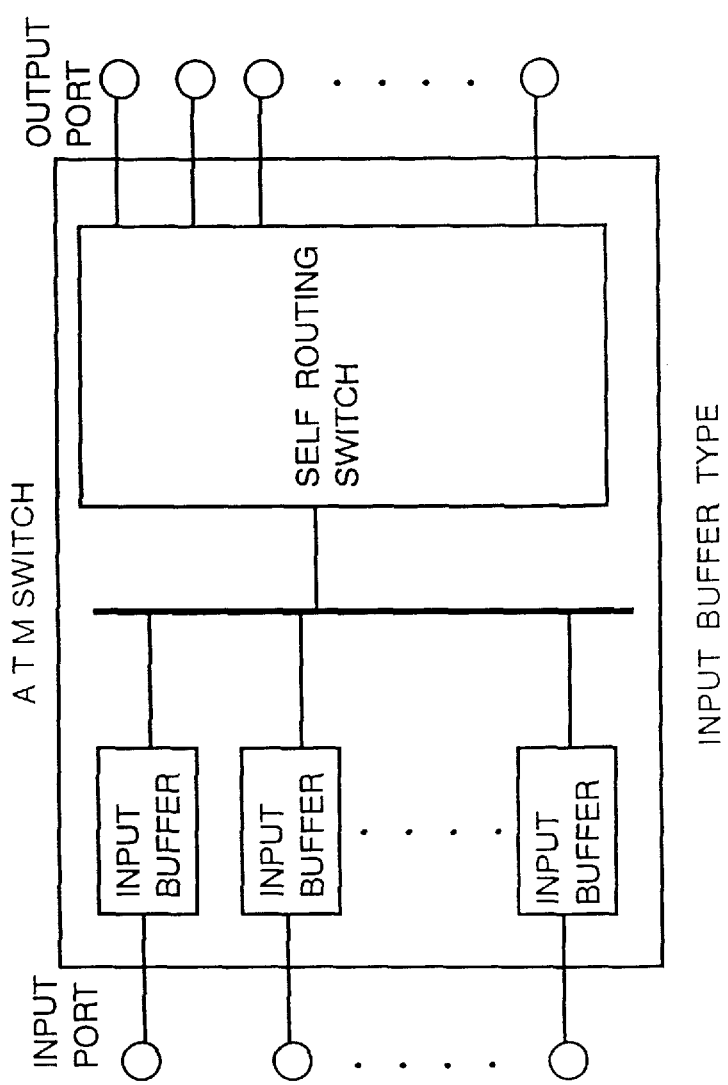
FIG. 24 shows an example of the ATM switch according to this invention.
Figure 25:
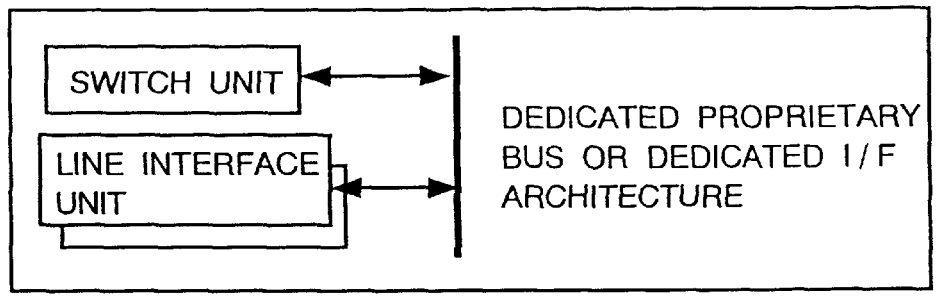
FIG. 25 shows a conventional ATM switch.
Figure 26:
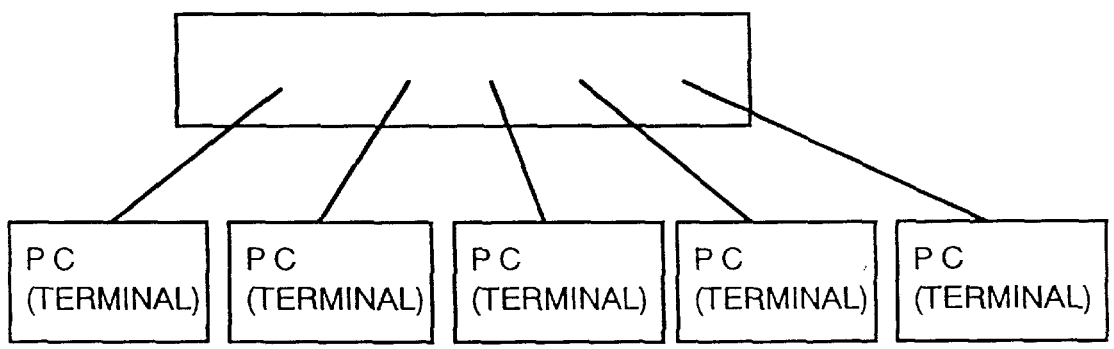
FIG. 26 shows a network configuration using a conventional ATM switch.
Figure 27:
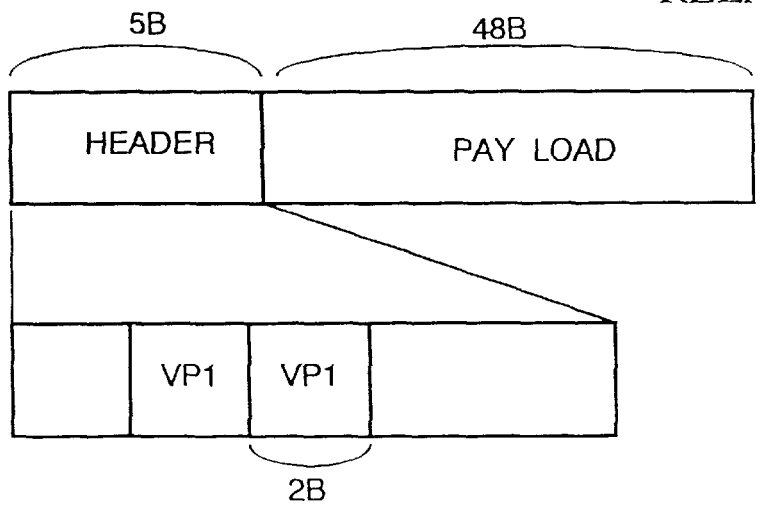
FIG. 27 shows a cell format.
Figure 28:
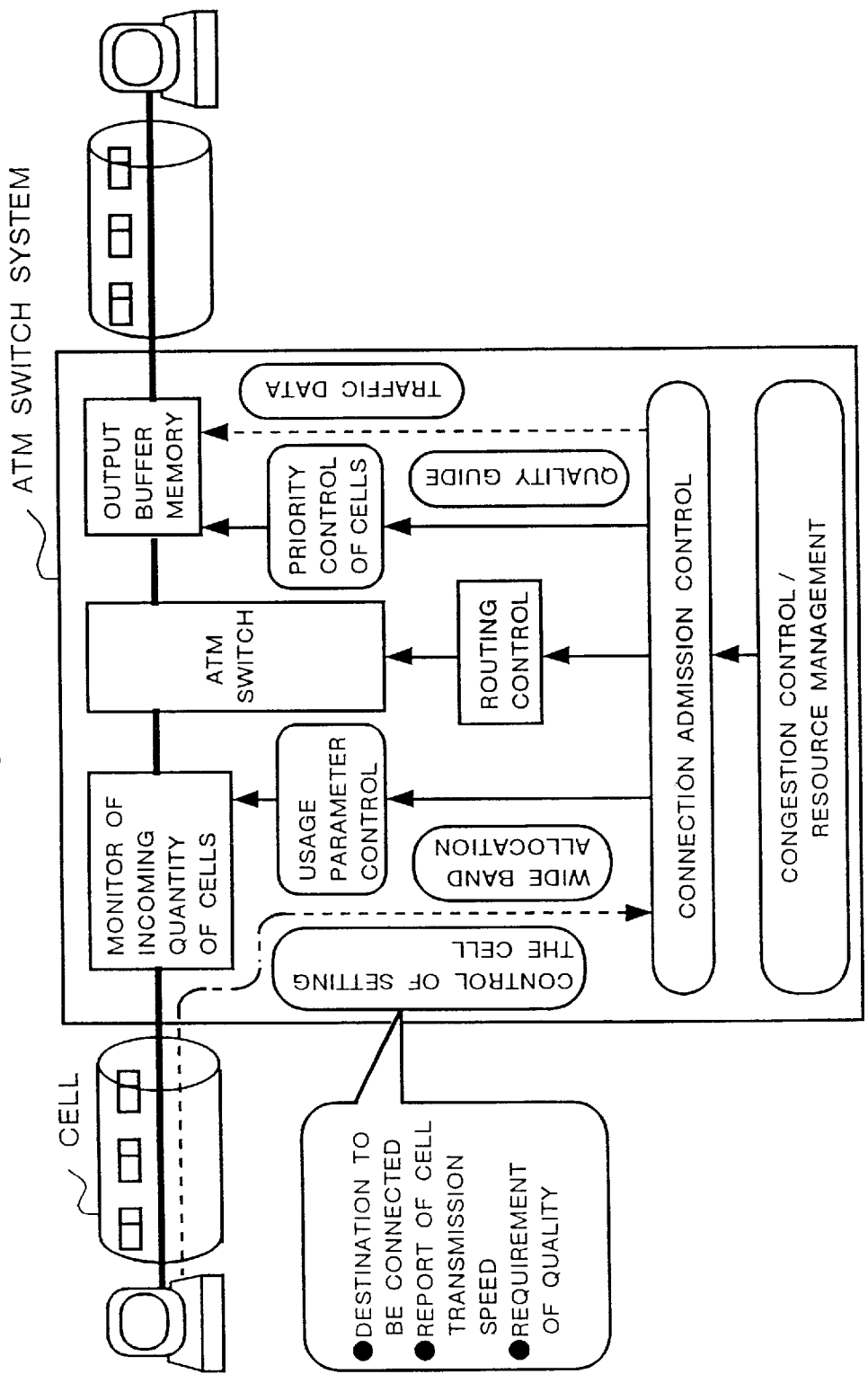
FIG. 28 shows a conventional ATM switch.
Figure 29:
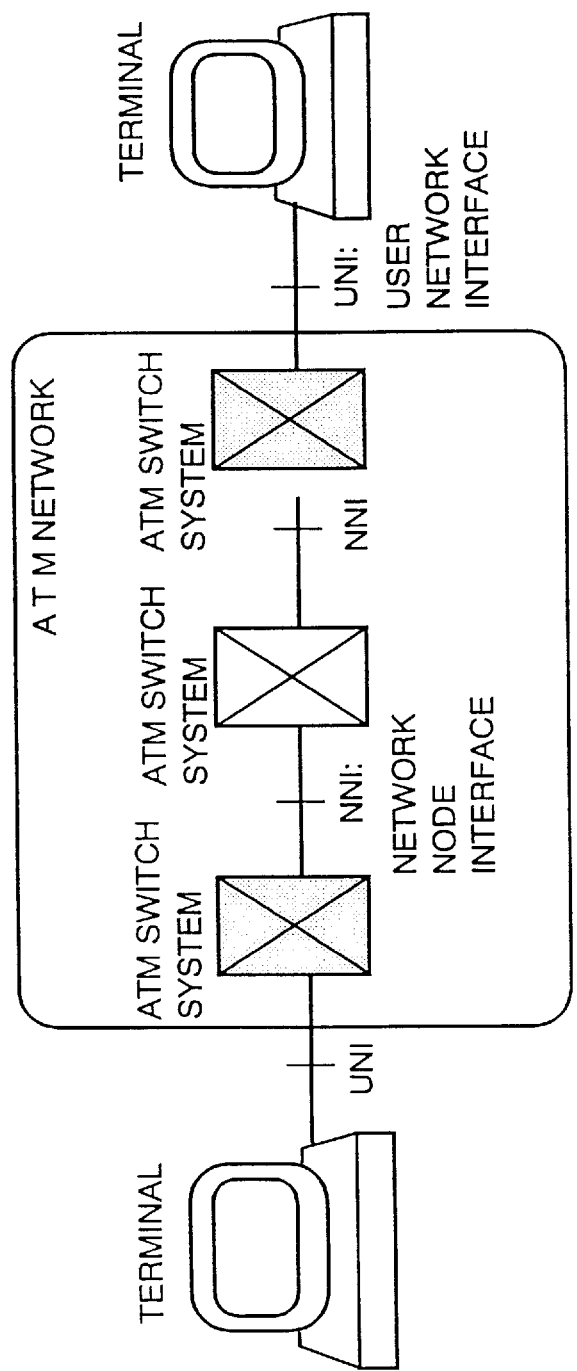
FIG. 29 shows a conventional ATM network.
Figure 30:
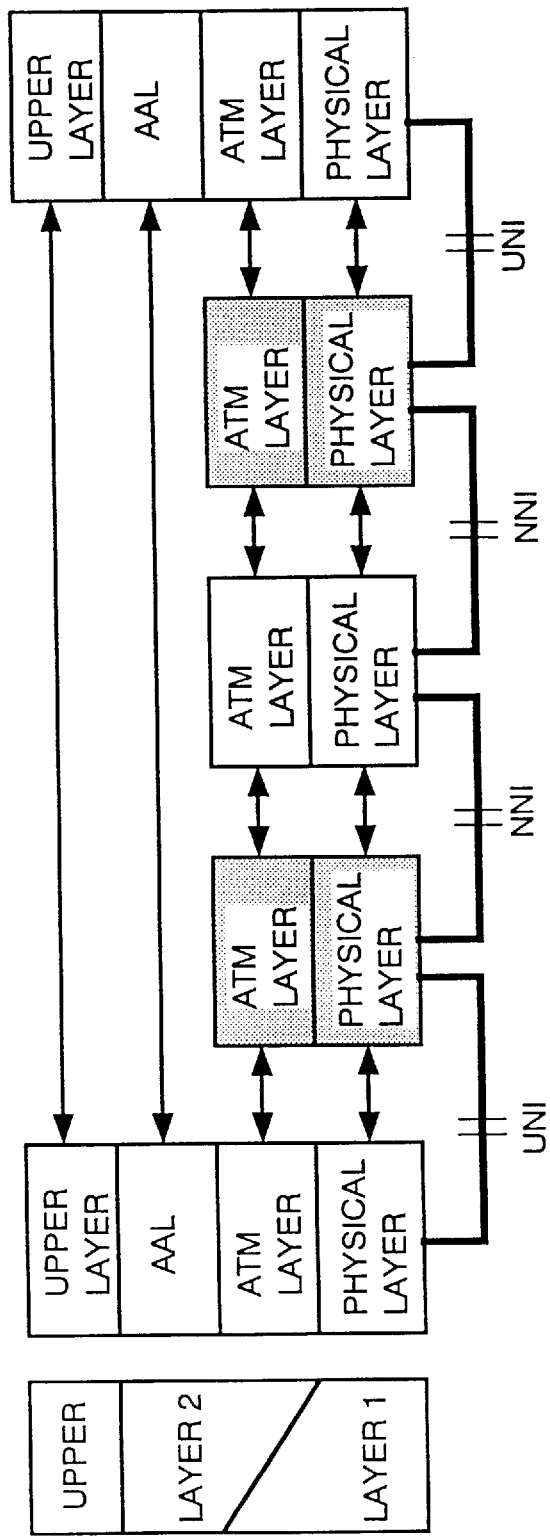
FIG. 30 shows a protocol of a conventional user information.
Figure 31:
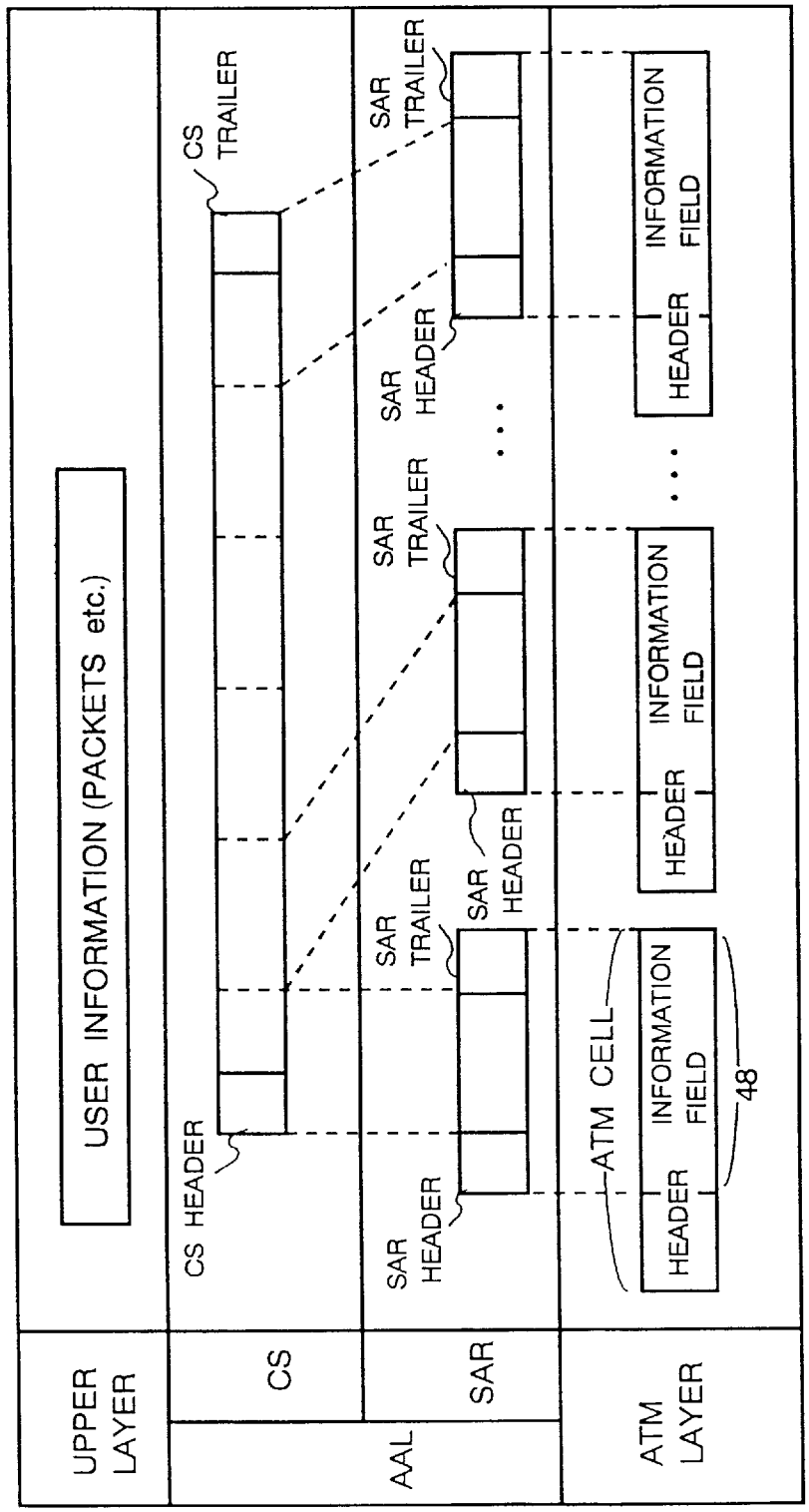
FIG. 31 shows a configuration of a conventional information.

In the predescribed embodiments, the common buffer type, shown in FIG. 21, ATM switch is used in the 8×8 switch 60. A cross point-type, an output buffer-type or an input buffer-type, shown in FIGS. 22 to 24, can be used in the 8×8 switch 60. It is also possible to use other types of ATM switches not shown in the figure.

In the predescribed embodiments, an 8×8 switch was used in the switch adapter 100. However, an M×N switch may be used in the switch adapter 100 as well.

A switch adapter 100, according to this invention, is an adaptor in which a switch function is formed. Since the switch function is realized as a form of an adapter, a specific input port of a plurality of input ports and a specific output port of a plurality of output ports, in a switch unit, are dedicated to an interface of a computer, which is connected to the switch adapter 100. A controller connected to the dedicated proprietary input ports and output ports is provided in the switch adapter. An interface unit is provided in the switch adapter 100, giving the switch adapter 100 an interface to the computer.

In the switch adapter 100, according to this invention, an address convertor identifies control data to control connection of a network. The switch unit outputs the control data to the specific output port dedicated to the computer. The switch unit performs switching in the switch adaptor for the established connection without affecting the computer. However, the control data that controls the network is output to the computer, where it is processed.

The address convertor provides a conversion table for rewriting the destination of the data. The address convertor also recognizes whether the input data is the control data by setting initial information that identifies the control data on the conversion table in advance.

The switching function in the switch adapter comprises an ATM switch or an ATM adaptation layer controller.

The switch adapter, according to this invention, sorts the data into switching data and signaling data. In case of the switching data, switching is performed in the switch adapter. In case of the signaling data, the signaling data is transferred to the computer through the controller and the interface unit.

The computer, according to this invention, mounts the switch adapter in a slot and provides a data processor that transfers data to and from the switch adapter. The computer, according to this invention, mounts the switch adapter in the slot, without damaging the function of the computer, and can operate as the switch apparatus.

The computer, according to this invention, receives the minimum data from the switch adapter. The data processor receives the control data, which is used to control the network. The data processor then sets the switch adapter, based on the control data and the connection. Since the other processes are performed in the switch adapter, the load of the computer is limited at its minimum.

The computer, according to this invention, provides a local area network board or a wide area network board. Data transfer, to and from the switch adapters, to these boards can be easily accomplished. Accordingly, a bridge function, a router function, or a line monitor function can be easily realized.

Since, according to this invention, the computer uses a standardized bus, another adapter to operate with the switch adapter can easily be found in the market.

Since, according to this invention, the computer uses a PCI bus standardized in a personal computer, the present invention can be applied to the personal computer using the PCI bus.

Since, according to this invention, the computer is a general purpose computer, specific hardware is not required in order to mount the switch adapter.

According to this invention, the switch adapter, in the computer, processes physical layer, an ATM layer and an AAL layer. The computer processes the upper layers of the AAL layer. Therefore, the computer itself diminishes a load of the computer.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only, and not intended to be limiting. The invention is limited only as defined in the following claims and the equivalents thereto.

What is claimed is:

1. A switch adapter comprising:
    a switch unit having a plurality of input ports that receive input data that has a destination and a plurality of output ports that outputs the input data with respect to the input data destination;
    a controller, coupled to the switch unit, that controls a data process, the controller being connected to a specific input port among the plurality of input ports of the switch unit and connected to a specific output port among the plurality of output ports of the switch unit;
    an interface unit, coupled to the controller, that provides an interface between the controller and an exterior device; and
    an address converter that rewrites the destination of the input data received from the plurality of input ports, wherein the address converter identifies control data that controls a network, in the input data received from the plurality of input ports, and rewrites the destination of the input data that is determined to be control data as the specific output port of the plurality of output ports.

2. The switch adapter of claim 1, wherein the address converter includes a conversion table that stores conversion information which is used to rewrite the destination of the input data received from the plurality of input ports, and wherein the address converter identifies the control data based on the conversion information and rewrites the destination of the control data to be the specific output port of the plurality of output ports, which is connected to the controller, based on the conversion information.

3. The switch adapter of claim 1, wherein the switch unit has an Asynchronous Transfer Mode (ATM) switch and the controller is an ATM adaptation layer (AAL) that processes a protocol of the ATM adaptation layer.

4. A switch adapter installed in a computer, comprising:
    a switch unit, having at least two input ports that receive input data that has a destination, that switches the input data according to the input data destination, and that outputs the input data to at least two output ports;
    an address converter, coupled to one of the at least two input ports, that sorts input data, received from the one of the at least two input ports, into control data and switching data, that sets a destination of the control data to a first output port of the at least two output ports and sets a destination of the switching data to one of the at least two output ports of the switch unit;
    a controller, connected to the first input port of the at least two input ports and to the first output port of the at least two output ports, that processes the control data and transfers the control data from and to the switch unit; and
    an interface unit that transmits the control data, processed by the controller, to a computer and transmits computer control data, generated by the computer, to the controller.

5. A computer, comprising:
    a switch adapter which includes:
        a switch unit, having a plurality of input ports that receives input data that has a destination, that switches the input data according to the input data destination, and that outputs the input data to a plurality of output ports;
        a controller that controls data processing, the controller being connected to a specific input port of the plurality of input ports of the switch unit and connected to a specific output port of the plurality of output ports of the switch unit;
        an interface unit that provides an interface between the controller and an exterior device;
        a bus that connects the interface unit of the switch adapter to the exterior device; and
        a data processor that processes data and transfers said processed data to the controller through the interface unit and the bus;
        an address converter that rewrites the destination of the input data received from the plurality of input ports, wherein the address converter identifies control data that controls a network, in the input data received from the plurality of input ports and rewrites the destination of the input data that is determined to be control data as the specific output port of the plurality of output ports; and
        a network interface adapter that provides an interface with another network, and wherein the switch adapter transfers data to and from the network interface adapter.

6. The computer of claim 5, wherein the switch unit of the switch adapter processes a physical layer and an ATM layer, wherein the controller of the switch adapter processes an ATM adaptation layer (AAL), and wherein the data processor of the computer processes an upper layer that is based on the AAL.

7. A computer, comprising:
a switch adapter which includes:
  a switch unit, having a plurality of input ports that receives input data that has a destination, that switches the input data according to the input data destination, and that outputs the input data to a plurality of output ports;
  a controller that controls data processing, the controller being connected to a specific input port of the plurality of input ports of the switch unit and connected to a specific output port of the plurality of output ports of the switch unit;
  an interface unit that provides an interface between the controller and an exterior device;
  a standardized bus that connects the interface unit of the switch adapter to the exterior device; and
  a data processor that processes data and transfers said processed data to the controller through the interface unit and the standardized bus; and
  an address converter that rewrites the destination of the input data received from the plurality of input ports, wherein the address converter identifies control data that controls a network, in the input data received from the plurality of input ports and rewrites the destination of the input data that is determined to be control data as the specific output port of the plurality of output ports.

8. The computer of claim 7, wherein the standardized bus is a peripheral controller interface (PCI) bus.

9. The computer of claim 7, wherein the switch unit of the switch adapter processes a physical layer and an ATM layer, wherein the controller of the switch adapter processes an ATM adaptation layer (AAL), and wherein the data processor of the computer processes an upper layer that is based on the AAL.

10. A general purpose computer, comprising:
a switch adapter which includes:
  a switch unit, having a plurality of input ports that receives input data that has a destination, that switches the input data according to the input data destination, and that outputs the input data to a plurality of output ports;
  a controller that controls data processing, the controller being connected to a specific input port of the plurality of input ports of the switch unit and connected to a specific output port of the plurality of output ports of the switch unit;
  an interface unit that provides an interface between the controller and an exterior device;
  a bus that connects the interface unit of the switch adapter to the exterior device; and
  a data processor that processes data and transfers said processed data to the controller through the interface unit and the bus;
  an address converter that rewrites the destination of the input data received from the plurality of input ports, wherein the address converter identifies control data that controls a network, in the input data received from the plurality of input ports and rewrites the destination of the input data that is determined to be control data as the specific output port of the plurality of output ports.

11. The computer of claim 10, wherein the switch unit of the switch adapter processes a physical layer and an ATM layer, wherein the controller of the switch adapter processes an ATM adaptation layer (AAL), and wherein the data processor of the computer processes an upper layer that is based on the AAL.

12. A data switching method of a general purpose computer which connects a switch adapter, having a switch unit, to a bus, comprising the steps of:
  A. receiving input data having a destination;
  B. recognizing whether input data is control data or switching data according to the destination of the input data, and setting the destination of the input data to correspond to a specific output port of the switch unit when the input data is control data;
  C. inputting the control data and the switching data to the switch unit, switching the switching data to the destination of the input data when the input data is switching data, and outputting the control data to the destination of the input data that corresponds to the specific output port of the switch unit when the input data is control data;
  D. transferring the control data output to the specific output port of the switch unit through the bus to the general purpose computer including steps of
    1) assembling the control data;
    2) storing the assembled control data temporarily; and
    3) transferring the stored control data to a memory of the general purpose computer; and
  E. processing the control data in the general purpose computer.

13. The data switching method of claim 12, wherein the step of processing the control data further includes
  setting, maintaining and releasing a call;
  generating control data for a calling terminal; and
  wherein the data switching method further comprises
    sending the generated control data for the calling terminal to the switch unit of the switch adapter, through the bus.

14. The data switching method of claim 13, wherein the step of processing the control data is one of the steps of setting, maintaining and releasing the call.

15. The data switching method of claim 13, wherein the step of sending the generated control data for the calling terminal includes transferring the generated control data from a memory of the general purpose computer to a memory of the switch adapter and segmenting the generated control data stored in the memory of the switch adapter.

16. A switch adapter, comprising:
  a switch unit having a plurality of input ports that receive input data that has a destination, and a plurality of output ports that output the input data according to the input data destination;
  controlling means, coupled to the switch unit, that receives the input data which is determined to be control data, from a controller output port of the plurality of output ports, performs data processing on the received control data and outputs the control data to a controller input port of the plurality of input ports, wherein the controlling means includes a data processing device that sets the switch adapter based on the control data received from the controller output port of the plurality of output ports;
  interface means, coupled to the controlling means, that allows for transmission of the control data between the switch adapter and an exterior device; and
  converting means, coupled to the switch unit, that converts the destination of the input data received by the switch unit and determined to be control data of the switch adapter into a destination corresponding to the controller output port of the plurality of output ports, the controller output port of the plurality of output ports being coupled to the controlling means.

17. The switch adapter of claim 16, wherein the data processing device includes a Random Access Memory (RAM) that stores the control data received from the controller output port of the plurality of output ports.

18. The switch adapter of claim 17, wherein the data processing device further includes a Central Processing Unit (CPU), coupled to the RAM, that performs data processing using the control data stored in the RAM.

19. A switch adapter, comprising:
   a switch unit having a plurality of input ports that receive input data that has a destination, and a plurality of output ports that output the input data according to the input data destination;
   controlling means, coupled to the switch unit, that receives the input data which is determined to be control data, from a controller output port of the plurality of output ports, performs data processing on the received control data and outputs the control data to a controller input port of the plurality of input ports;
   interface means, coupled to the controlling means, that allows for transmission of the control data between the switch adapter and an exterior device;
   converting means, coupled to the switch unit, that converts the destination of the input data received by the switch unit and determined to be control data of the switch adapter into a destination corresponding to the controller output port of the plurality of output ports, the controller output port of the plurality of output ports being coupled to the controlling means; and
   a Transmission Convergence/Asynchronous Transfer Mode (TC/ATM) control unit, coupled to the converting means, that separates an input frame into input data so that the destination of the input data can be converted by the converting means.

20. The switch adapter of claim 19, further including a physical layer protocol (PHY) unit, coupled to the TC/ATM control unit, that receives the input frame from a connection line, the connection line being connected to an exterior device in a network.

21. A computer comprising:
   a switch adapter including:
      a switch unit, having a plurality of input ports that receive input data and a plurality of output ports that output the input data;
      a controller that controls data processing of the input data that corresponds to control data, the controller being coupled to a controller input port of the plurality of input ports and the controller being coupled to a controller output port of the plurality of output ports;
      an interface unit that couples the controller to an exterior device;
   a bus that couples the interface unit to the switch adapter;
   a data processor, coupled to the interface unit, which transfers data through the interface unit and the bus; and
   wherein the switch adapter extracts control data from the input data received by the switch unit and transfers the control data to the data processor, and wherein the data processor sets the switch adapter to control a network, based on content of the control data; and
   a network interface adapter, coupled to the switch adapter, that provides and interface with another network, and wherein the switch adapter transfers data to and from the switch adapter.

22. A method for switching data in a general purpose computer, comprising the steps of:
   A. inputting input data having a destination;
   B. determining the input data to be one of either control data or switching data, according to the destination of the input data;
   C. setting the destination of the input data to a controller output port of a switch unit of a computer if the input data is determined to be control data;
   D. inputting the switching data to the switch unit;
   E. switching the switching data according to the destination of the switching data;
   F. outputting the control data to a controller output port of the switch unit;
   G. transferring the control data, output to the controller port, to the general purpose computer through a bus, the transferring step including steps of:
      1) assembling the control data;
      2) storing the assembled control data temporarily; and
      3) transferring the control data to a memory of the general purpose computer; and
   H. processing the control data, transferred through the bus, in the general purpose computer.

23. A method for switching data in a general purpose computer, comprising the steps of:
   A. inputting input data having a destination;
   B. determining the input data to be one of either control data or switching data, according to the destination of the input data;
   C. setting the destination of the input data to a controller output port of a switch unit of a computer if the input data is determined to be control data;
   D. inputting the switching data to the switch unit;
   E. switching the switching data according to the destination of the switching data;
   F. outputting the control data to a controller output port of the switch unit;
   G. transferring the control data, output to the controller port to the general purpose computer, through a bus; and
   H. processing the control data, transferred through the bus, in the general purpose computer the processing step further including steps of:
      setting, maintaining and releasing a call; and
      generating control data for a calling terminal.

24. The data switching method of claim 23, further including the step of transmitting the generated control data to the switch unit of the switch adapter, through the bus.

25. The data switching method of claim 24, wherein the step of transmitting further includes:
   transferring the control data from a memory of the general purpose computer to a memory of the switch adapter; and
   segmenting the control data stored in the memory of the switch adapter.

26. A computer system, comprising:
   a plurality of interconnected computers;
   a plurality of interface units, each interface unit connecting one computer of the plurality of interconnected computers to another computer of the plurality of interconnected computers;

each computer of the plurality of computers including:
- a plurality of adapters including a switch adapter, a remote maintenance Local Area Network (LAN) adapter, coupled to the switch adapter, a wide area network connecting adapter, coupled to the switch adapter, and a LAN adapter, coupled to the switch adapter; and
- a mainframe bus connected to each of the plurality of adapters;

wherein each computer can transmit data to any other computer via at least one interface unit.

27. The network of claim 26, wherein the switch adapter of each computer gives that computer the ability to perform a switching function.

28. The network of claim 27, wherein each computer of the plurality of computers in the network is coupled to at least one computer of the plurality of computers, forming a matrix configuration, due to the ability of each computer of the plurality of computers to perform the switching function.

29. The network of claim 28, wherein each computer of the plurality of computers can be removed or added to the network, and wherein each computer of the plurality of computers can transmit data to any other computer of the plurality of computers of the network.

30. The network of claim 29, wherein each computer of the network may be coupled to more than one of the plurality of computers in the network, in order for each computer to become part of the network.

31. The network of claim 26, wherein the remote maintenance LAN adapter is coupled to the switch adapter to determine whether the switch adapter is working properly or has failed, and carries out remote maintenance and diagnosis on the switch adapter, attempting to recover information lost in the switch adapter, when the switch adapter fails.

* * * * *